(12) United States Patent
Taylor et al.

(10) Patent No.: US 12,441,993 B2
(45) Date of Patent: Oct. 14, 2025

(54) ISOLATION OF EXTRACELLULAR VESICLES BY PRECIPITATION OR IMMOBILIZATION USING POLYETHYLENIMINE AND POLYETHYLENIMINE-COATED SOLID SUPPORTS

(71) Applicant: Atlantic Cancer Research Institute (ACRI), Moncton (CA)

(72) Inventors: Catherine Taylor, Boundary Creek (CA); Jeremy Roy, Moncton (CA)

(73) Assignee: ATLANTIC CANCER RESEARCH INSTITUTE, Moncton (CA)

( * ) Notice: Subject to any disclaimer, the term of this patent is extended or adjusted under 35 U.S.C. 154(b) by 743 days.

(21) Appl. No.: 17/052,643

(22) PCT Filed: May 17, 2019

(86) PCT No.: PCT/CA2019/050669
§ 371 (c)(1),
(2) Date: Nov. 3, 2020

(87) PCT Pub. No.: WO2019/218077
PCT Pub. Date: Nov. 21, 2019

(65) Prior Publication Data
US 2021/0238584 A1 Aug. 5, 2021

Related U.S. Application Data
(60) Provisional application No. 62/673,415, filed on May 18, 2018.

(51) Int. Cl.
*C12N 15/10* (2006.01)
*A61K 35/51* (2015.01)
*A61K 35/545* (2015.01)
*G01N 33/574* (2006.01)

(52) U.S. Cl.
CPC .......... *C12N 15/1013* (2013.01); *A61K 35/51* (2013.01); *A61K 35/545* (2013.01); *G01N 33/57488* (2013.01)

(58) Field of Classification Search
None
See application file for complete search history.

(56) References Cited

U.S. PATENT DOCUMENTS

| | | |
|---|---|---|
| 9,005,888 B2 | 4/2015 | Antes et al. |
| 9,816,998 B2 | 11/2017 | Lyden et al. |
| 2007/0105094 A1 | 5/2007 | Fujita et al. |
| 2018/0179577 A1 | 6/2018 | Hu et al. |

FOREIGN PATENT DOCUMENTS

| | | |
|---|---|---|
| EP | 2839278 A1 | 2/2015 |
| WO | 2013180655 A1 | 12/2013 |

OTHER PUBLICATIONS

Written Opinion and International Search Report of WO 2019218077 dated Jul. 25, 2019.
Tang et al., "Comparison of isolation methods of exosomes and exosomal RNA from cell culture medium and serum", Int J Mol Med., 2017, vol. 40(3), pp. 834-844.
Sui DP et al., "Application of poly (ethyleneimine) solution as a binding agent in DGT technique for measurement of heavy metals in water", Talanta, 2013, vol. 114, pp. 276-282.
Stranska et al., "Comparison of membrane affinity-based method with size-exclusion chromatography for isolation of exosome-like vesicles from human plasma", J Transl Med., 2018, vol. 16(1), pp. 1-9.
Simpson RJ., "Precipitation of Proteins by Polyethylenimine", Cold Spring Harb Protoc, 2006.
Shen et al., "Polyethylenimine-based micro/nanoparticles as vaccine adjuvants", Int J Nanomedicine, 2017, vol. 12, pp. 5443-5460.
Shchukina et al., "Novel polymer-based anion-exchangers with covalently-bonded functional layers of quaternized polyethyleneimine for ion chromatography", Anal Chim Acta., 2017,964, pp. 187-194.
Povey et al., "Magnetic polyethyleneimine (PEI) microcapsules as retrievable traps for carcinogen electrophiles formed In the gastrointestinal tract", Cancer Lett. 1987; vol. 36(1), pp. 45-53.
Paris S et al., "Opposing roles of syndecan-1 and syndecan-2 in polyethyleneimine-mediated gene delivery", J Biol Chem, 2008, vol. 283(12), pp. 7697-7704.
Marenchino M et al., "Rapid and efficient purification of RNA-binding proteins: application to HIV-1 Rev", Protein Expr Purif, 2009, vol. 63(2), pp. 112-119.
Ma J et al., "Using precipitation by polyamines as an alternative to chromatographic separation in antibody purification processes", J Chromatogr B Analyt Technol Biomed Life Sci., 2010, vol. 878, pp. 798-806.
Liang J et al., "Effective elimination of nucleic acids from bacterial protein samples for optimized blue native polyacrylamide gel electrophoresis", Electrophoresis, 2009, vol. 30(14), pp. 2454-2459.
Li P et al, "Progress in Exosome Isolation Techniques", Theranostics, 2017, vol. 7(3), pp. 789-804.
Eclercq F et al., "Synthesis of glycosylated polyethylenimine with reduced toxicity and high transfecting efficiency", Bioorg Med Chem Lett., 2000, vol. 10(11), pp. 1233-1235.
Kwolek U et al., "Interactions of Polyethylenimines with Zwitterionic and Anionic Lipid Membranes", Langmuir, 2016, vol. 32(19), pp. 5004-5018.

(Continued)

*Primary Examiner* — Michael V Meller
(74) *Attorney, Agent, or Firm* — Smart & Biggar LP; Luba Naiberger

(57) ABSTRACT

The present application relates to methods for the isolation of EVs from a sample containing EVs, the method comprising: (i) contacting the sample with one or more polyethylenimines to form an EV-polyethylenimine complex; and (ii) separating the EV-polyethylenimine complex from the sample. Also included in the application are kits for performing the methods for isolating EVs and methods of diagnosis and therapy using the EVs isolated using the described methods.

14 Claims, 21 Drawing Sheets

(56) References Cited

OTHER PUBLICATIONS

Jiang L et al., "Polyethylenimine modified poly(ethylene terephthalate) capillary channeled-polymer fibers for anion exchange chromatography of proteins", J Chromatogr A, 2015, vol. 1410, pp. 200-209.
Hobel S et al., "Polyethylenimines for siRNA and miRNA delivery in vivo", Wiley Interdiscip Rev Nanomed Nanobiotechnol, 2013, vol. 5(5), pp. 484-501.
Hanzliková M1 et al., "Mechanisms of polyethylenimine-mediated DNA delivery: free carrier helps to overcome the barrier of cell-surface glycosaminoglycans", J Gene Med, 2011, vol. 13(7-8), pp. 402-409.
Hamdous Y et al., "Biocompatible coated magnetosome minerals with various organization and cellular interaction properties induce cytotoxicity towards RG-2 and GL-261 glioma cells in the presence of an alternating magnetic field", J Nanobiotechnology, 2017, vol. 15(1):74, pp. 1-18.
Hall A et al., "Polyplex Evolution: Understanding Biology, Optimizing Performance", Mol Ther, 2017, vol. 25(7), pp. 1476-1490.
Forrest ML et al., "A degradable polyethylenimine derivative with low toxicity for highly efficient gene delivery", Bioconjug Chem., 2003, vol. 14(5), pp. 934-940.
Ferrati S et al., "Cellular communication via nanoparticle-transporting biovesicles", Nanomedicine (Lond), 2014, vol. 9 (5), pp. 581-592.
Deregibus MC et al., "Charge-based precipitation of extracellular vesicles", Int J Mol Med. 2016, vol. 38(5), pp. 1359-1366.
Curtis KA et al., Unusual Salt and pH Induced Changes in Polyethylenimine Solutions, Plos One, 2016, vol. 11(9).
Buscail L, et al., "First-in-man Phase 1 Clinical Trial of Gene Therapy for Advanced Pancreatic Cancer: Safety, Biodistribution, and Preliminary Clinical Findings", Mol Ther., 2015, vol. 23(4), pp. 779-789.
Burgess RR., "Protein precipitation techniques", Methods Enzymol., 2009; vol. 463, pp. 331-342.
Boussif O et al., "A versatile vector for gene and oligonucleotide transfer into cells in culture and in vivo: polyethylenimine", Proc Natl Acad Sci USA., 1995, vol. 92(16), pp. 7297-7301.
Bonnet ME et al., "Systemic delivery of DNA or siRNA mediated by linear polyethylenimine (L-PEI) does not induce an Inflammatory response", Pharm Res., 2008, vol. 25(12), pp. 2972-2982.
Aravindan L et al., "Effect of acyl chain length on transfection efficiency and toxicity of polyethylenimine", Int J Pharm., 2009, vol. 378(1-2), pp. 201-210.
Amit D et al., "Development of targeted therapy for a broad spectrum of cancers (pancreatic cancer, ovarian cancer, glioblastoma and HCC) mediated by a double promoter plasmid expressing diphtheria toxin under the control of H19 and IGF2-P4 regulatory sequences", Int J Clin Exp Med., 2012, vol. 5(4), pp. 296-305.
Amit D et al., "Development of targeted therapy for bladder cancer mediated by a double promoter plasmid expressing diphtheria toxin under the control of H19 and IGF2-P4 regulatory sequences", J Transl Med., 2010, vol. 8: 134.
Wen Y et al., "A biodegradable low molecular weight polyethylenimine derivative as low toxicity and efficient gene vector", Bioconjug Chem., 2009, vol. 20(2), pp. 322-332.
Wang X et al., "Polyethyleneimine-Based Nanocarriers for Gene Delivery", Curr Pharm Des., 2015, vol. 21(42), pp. 6140-6156.
Van Deun J et al., "The impact of disparate isolation methods for extracellular vesicles on downstream RNA profiling", J Extracell Vesicles., 2014, vol. 3.
Uchida E et al., "Optimization of the virus concentration method using polyethyleneimine-conjugated magnetic beads and its application to the detection of human hepatitis A, B and C viruses", J Virol Methods., 2007, vol. 143(1), pp. 95-103.
Satoh K et al., "Virus concentration using polyethyleneimine-conjugated magnetic beads for improving the sensitivity of nucleic acid amplification tests", J Virol Methods., 2003, vol. 114, pp. 11-19.
Boeris V et al., "The formation of non-soluble complexes between polyethyleneimine-anions and their potential use to isolate enzymes", Colloids and Surfaces B: Biointerfaces, 2011, vol. 82, pp. 354-358.
Weng et al., "Effective isolation of exosomes with polyethylene glycol from cell culture supernatant for in-depth proteome profiling", Analyst, Jan. 1, 2016.
Weng et al., "Supplemental Material for: Effective isolation of exosomes with polyethylene glycol from cell culture supernatant for in-depth proteome profiling", Analyst, vol. 141, No. 15, Jan. 1, 2016.
Zeringer et al., "Strategies for Isolation of Exosomes", Cold Spring Harbor Protocol, vol. 2015, No. 4, Apr. 1, 2015.

| | |
|---|---|
| Linear PEI fragment |  |
| Branched PEI fragment (example) |  |
| PEI dendrimer (example, generation 4) |  |

[100nm DOPC/CHOL Liposomes labeled with Fluorescein DHPE]

A)

B)

ISOLATION OF EXTRACELLULAR VESICLES BY PRECIPITATION OR IMMOBILIZATION USING POLYETHYLENIMINE AND POLYETHYLENIMINE-COATED SOLID SUPPORTS

RELATED APPLICATION

This application is a National Stage of co-pending International Application No. PCT/CA2019/050669, filed on May 17, 2019 which claims the benefit of priority from U.S. provisional patent application No. 62/673,415, filed on May 18, 2018, the contents of both of which are incorporated herein by reference in their entirety.

The present application is related to methods of isolating extracellular vesicles (EVs). In particular, the application is related to the use of polyethylenimine for the enrichment of EVs from biological tissues and fluids with diagnostic and prognostic significance to pathological conditions, as well as for their inclusion in therapeutic strategies.

BACKGROUND

Extracellular vesicles (EVs) are cell-derived vesicles, which include exosomes, ectosomes (microparticles and microvesicles), and apoptotic bodies, that are secreted from almost all cell types into the extracellular environment and which have been found in most body fluids, including blood, urine, milk, cerebrospinal fluid, semen, malignant effusions, ascites, etc. These secreted EVs participate in both normal physiological and pathological processes, in part by transmitting specific information, for example, by transmission of DNA, RNA, or protein, from their cell of origin to their target cells[1]. Increased numbers of EVs have been reported in blood and other biological fluids in response to cancers and other pathological conditions[2-5].

Liquid biopsy is a term used to describe the analysis of a blood sample for DNA, RNA, or protein markers derived from diseased cells or EVs derived from diseased cells that are circulating in blood. Liquid biopsy can provide valuable genetic and phenotypic information about a patient's disease which can impact diagnosis and prognosis, as well as highlight actionable mutations, for example, that can impact patient stratification and therapeutic strategies. Implementation of routine liquid biopsy analysis has been proposed as a means of improving current disease staging protocols in order to improve patient stratification and outcome[6-7].

EVs, including exosomes (~30-150 nm) and microvesicles (~100-350 nm), mediate intercellular communication and contain a cell-specific cargo including, but not limited to, growth factors, enzymes, receptors, cytokines, lipids, and coding and non-coding DNA and RNA molecules[8,9]. Since they have been designed by nature to efficiently deliver cargo to target cells, the interest in the use of EVs as therapeutics, for example in anti-tumour immunotherapy, as anti-infectious agents, and in immune-modulatory and regenerative therapies, has been growing rapidly[10]. Although genomic and mitochondrial DNA has been reported inside EVs, most of the DNA found in human blood plasma is thought to be outside of the EVs[11].

EVs contain a wide range of RNA types with a reported prevalence of non-coding RNA, but also ribosomal RNA (rRNA), transfer RNA (tRNA), long non-coding RNA (lncRNA), piwi-interacting RNA (piRNA), small nuclear RNA and small nucleolar RNA (snoRNA), microRNA (miRNA) and messenger RNA (mRNA) have been identified inside EVs[12-15]. EVs have been demonstrated to function in the transfer of oncogenic molecules between cells at metastatic sites[16] and transfer of EV-derived mRNA to modulate target cell behaviour has been identified as an important aspect in tumour development[17]. Other studies have demonstrated that EVs contain mRNAs that originate from a cytoplasmic RNA pool and reflect the profile of the originating cell and tumour-derived EVs can carry tumour-specific alterations in mRNA species[18]. Thus, the EV mRNA cargo within EVs can be used as a source for cancer-derived biomarkers that may be important in the development of diagnostic tests. The use of cell derived vesicles (CDVs), including exosomes, for detecting biomarkers for diagnostic, therapy-related or prognostic methods is described, for example, in WO 2010/056337.

No single standardized method exists for isolation of EVs for use in diagnostic or therapeutic applications. The most commonly used methods for isolating EVs involves ultracentrifugation-based techniques[19], used with or without sucrose density gradients or sucrose cushions, which are time-consuming, require specialized equipment not available at point-of-care sites, and thus can pose significant challenges for their adoption in clinical diagnostic labs. Ultracentrifugation (UCF) techniques also suffer from exosome losses due to the heterogeneity of EVs[19] and can result in impairment of the functionality of EVs[10] which may limit its use in isolation of EVs for therapeutic applications.

Other popular methods for extracellular vesicle isolation are size-based techniques, such as ultrafiltration or size exclusion chromatography. Although ultrafiltration techniques are faster than ultracentrifugation and don't require specialized equipment, the use of force results in shear stress that can cause deformation and breaking apart of EVs which may limit their effectiveness in therapeutic applications as well as be detrimental to biomarker analysis[19]. Losses in EVs can also occur by vesicle binding to filtration membranes and clogging of filters, which can impact yields. However, tangential flow filtration has been combined with ultracentrifugation to isolate therapeutic exosomes for clinical trials[20]. Isolation of pure EVs using a new membrane affinity spin column (exoEasy™ kit, Qiagen) from plasma is limited by contamination with lipoproteins, albumin, and low levels of EV-associated proteins suggesting that these methods may be isolating mainly non-EV protein aggregates[21].

A popular method for isolation of EVs for research purposes is a precipitation method which is based on reducing the solubility of EVs by the use of water-excluding polymers (e.g. ExoQuick™, System Biosciences, USA). The use of water-excluding polymers, such as polyethylene glycol, to precipitate exosomes using low-speed centrifugation from a biological fluid is described, for example, in U.S. Pat. No. 8,901,284. This method is easy to use, scalable, and does not require specialized equipment. However, its usefulness in diagnostics and therapeutics is limited by long processing times and the low purity of the resulting EVs fraction due to co-precipitation of non-exosomal contaminants, including non-exosomal proteins, albumin (plasma or serum samples), and polymer[19,22]. Another pitfall with this method is that Exoquick™ preparations of EVs have been shown to be contaminated with Argonaut[23], an RNA-binding protein known to form extracellular complexes with miRNAs[24], thereby indicating that these preparations are contaminated with non-exosomal RNA which may hamper detection of RNAs of interest that are specifically contained within EVs[23]. Extracellular vesicle-derived mRNAs and miRNAs are potentially useful biomarkers for many pathological conditions[25,26].

Other methods used for extracellular vesicle isolation include immunoaffinity-capture based techniques and microfluidic-based methods, but these methods can only process small samples and result in low yields. In the case of immunoaffinity-based methods, this may be in part the result of the dependence on the availability of the necessary epitope. The overall negative charge of EVs has also been exploited to facilitate their purification using either protamine[27] or anion exchange chromatography to purify membrane vesicles, particularly exosomes (see, for example, U.S. Pat. No. 6,899,863).

The availability of reagents and protocols that are amenable to the growing field of extracellular vesicle-based diagnostic and translational therapeutic research are anticipated to be highly useful, especially in any area where repetitive and non-injurious collection and analysis of biological fluid is desired, such as for liquid biopsy applications.

Polyethylenimine (PEI) describes a group of hydrophilic cationic polymers that encompass polymers that are synthesized as either linear or branched forms of varying molecular masses and polydispersities and which contain either secondary amine groups (linear PEI) or primary, secondary, and tertiary amine groups (branched PEI). A wide range of molecular weights of PEI exist for both linear and branched forms, ranging from less than 1000 to 750,000 Da and are usually reported as an average molecular weight.

PEI has been used in industrial applications, for example, as a chelator of metal ions[28] solution as a binding agent in diffusive gradients in thin-films (DGT) technique for measurement of heavy metals in water, it is used during protein purification to remove contaminating nucleic acids and acidic proteins[29-32], as a coating to promote cellular attachment (see, for example, US Patent Application Publication Number 2012/003271), and as retention aids in the manufacturing of paper and paperboard (Polymin® P). PEI also has applications in the biomedical field as a transfection reagent[33-36], as well as for gene therapy applications[37-39] and as an adjuvant for vaccines[40]. The use of PEI conjugates, such as PEI conjugated to glutaraldehyde, for signal amplification in biomedical testing applications is described, for example, in U.S. Pat. No. 7,964,415.

PEI is used as a polymeric transfection reagent due to its ability to bind and condense nucleic acids into nanoparticles, thereby protecting them from degradation and facilitating their uptake into cells, which is facilitated by interaction with Zwitterionic and anionic lipid membranes[41]. Several cell-surface proteins have been identified as candidates for polyethylenimine polyplex binding during the transfection process including heparan sulfate proteoglycans, in particular syndecan 1 and syndecan 2[42] and glycosaminoglycans[43]. Following uptake, polyethylenimine-supermagnetic iron oxide nanoparticles (SPIONS) can be internalized into multivesicular bodies and excreted from the cell[44]. Magnetic beads coated with PEI are used to concentrate viruses[45], for anion exchange[46,47], DNA/RNA isolation[48], and as retrievable traps for carcinogen electrophiles[49].

Some forms of PEI, for example linear PEI MW 25 kDa, are known to be biocompatible[50-53]. Biocompatibility of PEI can be further improved by acylation or glycosylation of primary amines[53,54]. PEI is also used as a biocompatible coating[55]. Furthermore, GMP-grade PEI (invivo-jetPEI™, Polyplus Transfection) is available and has been used in multiple clinical trials.

SUMMARY

In the present application, methods for using polyethylenimine polymers for the isolation of EVs from a wide variety of biofluids or tissues quickly and with high efficiency using standard clinical lab equipment are provided. Also, because polyethylenimine polymers may directly precipitate EVs, rather than relying on precipitating EVs by means of excluding water (e.g. U.S. Pat. No. 8,901,284), the resulting isolated EVs are purer due to less contamination by co-precipitating proteins, such as observed with this other polymer isolation method. Further, unlike other polymers (e.g. ExoQuick™) used for EV isolation, polyethylenimines are relatively non-toxic and biocompatible, and one particular polyethylenimine, (linear 22-kDa polyethylenimine, invivo-jetPEI™), is available as GMP material, has a drug file with the FDA and has been used in multiple clinical trials in human patients. This opens up possibilities with respect to the use of EVs isolated using a simple polyethylenimine-based precipitation method described herein for human therapeutic solutions since any carry-over of polyethylenimine in the extracellular vesicle preparation would not prevent their subsequent use therapeutically, for instance, by injection of the purified EVs into the blood stream of a patient. The presently available methods used to capture EVs for human therapeutic clinical trials[10] (e.g. ultrafiltration combined with ultracentrifugation on a sucrose cushion) require expensive equipment, are time- and labour-intensive, result in high losses of EVs and ultracentrifugation has been shown to result in therapeutically inactive fractions of extracellular vesicles[10]. The methods described in the present application are amenable to processing large sample volumes and provide high yields. Thus the methods, compositions and kits of the present application represent a simple, fast, and scalable method for recovering EVs of sufficient functionality and purity for development of human therapeutics.

In addition, the free amine groups of polyethylenimine make it amenable, for example, to immobilization on solid supports and to adaptation for use in automated systems.

The present application therefore includes a method for the isolation of EVs from a sample containing EVs, comprising contacting the sample with one or more polyethylenimines under conditions for the isolation of EVs. In some embodiments, the conditions comprise:
(i) contacting the sample with the one or more polyethylenimines to form an EV-polyethylenimine complex; and
(ii) separating the EV-polyethylenimine complex from the sample.

The present application also includes for a kit for the isolation of EVs from biological samples.

Given the biological relevance of EVs obtained by the methods described in the application, the application also includes methods for determining the presence, absence, relapse, remission or progression of one or more pathological conditions comprising:
(i) isolating EVs from a sample from a subject suspected of having the one or more pathological conditions using a method of the present application;
(ii) identifying one or more biomarkers for the one or more pathological conditions in the EVs, wherein the presence, absence, or change in amount of the one or more biological markers in the EVs indicates the presence, absence, relapse, remission, or progression of the one or more pathological conditions in the subject.

In some embodiments, the methods of the present application are used to determine the effectiveness of a therapy in the treatment of one or more pathological conditions. Therefore in some embodiments, the application also includes a method to determine the effectiveness of a therapy in the treatment of one or more pathological conditions in a subject diagnosed with having one or more pathological conditions comprising:
(i) isolating EVs from a sample from the subject using a method of the present application;
(ii) determining an amount of one or more biomarkers for the one or more pathological conditions in the EVs;
(iii) subjecting the subject to the therapy;
(iv) isolating EV's from the subject using a method of the present application one or more times post-therapy and determining an amount of the one or more biomarkers for the one or more pathological conditions at each of the one or more times; and
(v) comparing the amount of the one or more biomarkers obtained post-therapy to the amount of the one or more biomarkers in (ii), wherein a change in the amount of the one or more biomarkers is indicative of the effectiveness of the therapy.

The present application also includes a method of predicting a subject's response to one or more therapeutic treatments for one or more pathological conditions comprising:
(i) isolating EVs from a sample from a subject using a method of the present application; and
(ii) determining an amount of one or more biomarkers that is/are predictive of responsiveness to the one or more therapeutic treatments for the one or more pathological conditions in the EVs; wherein the presence or absence of the one or more biomarkers is indicative of the subject's response to the one or more treatments.

In addition, the present application also includes a method of determining the presence of one or more pathological conditions comprising:
(i) isolating EVs from a sample from a subject suspected of having the one or more pathological conditions using a method of the present application; and
(ii) determining the concentration of the EV's in the sample;
wherein an increase in concentration of EV's in the sample compared to a concentration of EV's in a sample from healthy subjects is indicative of the presence of the one or more pathological conditions in the subject.

In some embodiments, the pathological condition is cancer.

The present application also includes a method for isolating EVs for therapeutic use comprising:
(i) isolating EVs from a sample from a subject using a method of the present application;
(ii) releasing the EVs from the polyethylenimine; and
(iii) formulating the released EVs in a pharmaceutical composition.

Other features and advantages of the present application will become apparent from the following detailed description. However, it should be understood that the detailed description and the specific examples, while indicating embodiments of the application, are given by way of illustration only and the scope of the claims should not be limited by these embodiments, but should be given the broadest interpretation consistent with the description as a whole.

DRAWINGS

The embodiments of the application will now be described in greater detail with reference to the attached drawings in which.

Figure 7:
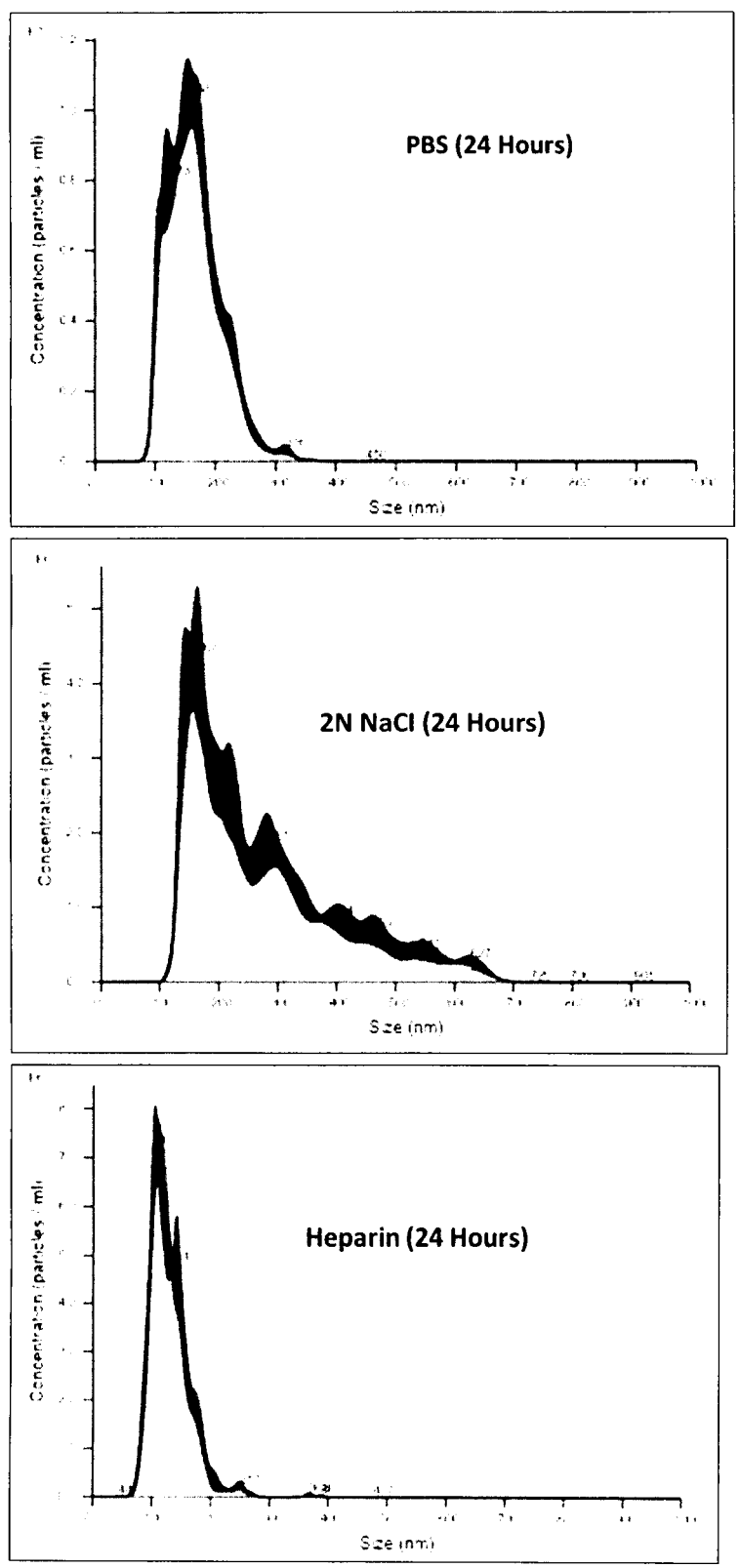
Figure 8:
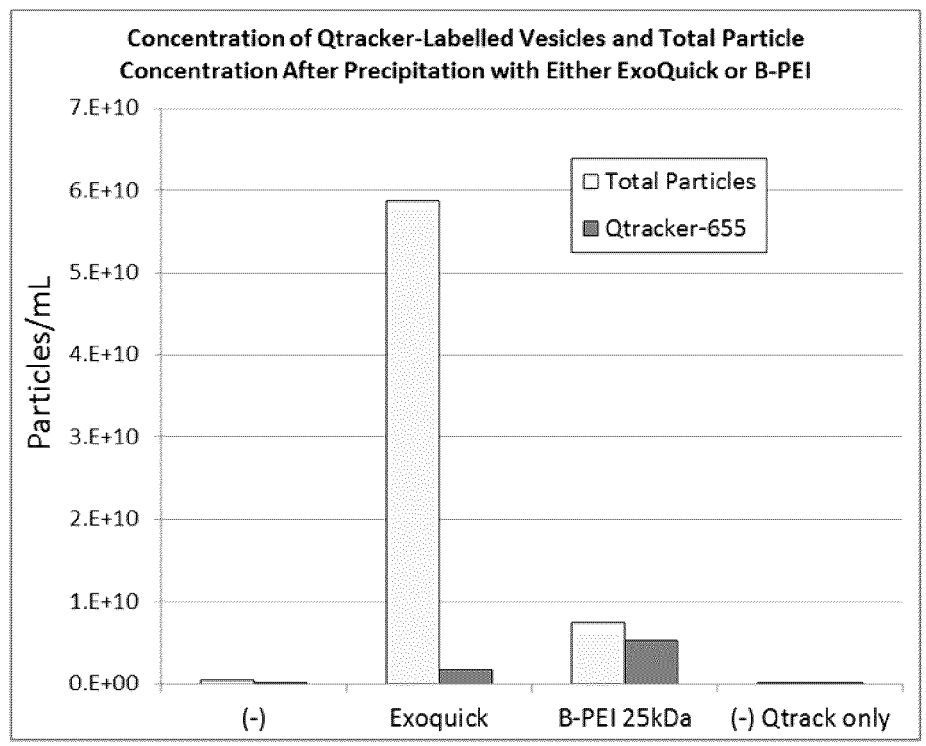

FIG. 7 shows particle size distribution using nanoparticle tracking analysis of EVs isolated from BXPC3 pancreatic cancer cell bioreactor media using an exemplary embodiment of a method of the application, after dissociation from PEI using different dissociation buffers and time for dissociation to occur FIG. 8 shows a graph demonstrating analysis of lipid-bound vesicles isolated from PANC10.05 pancreatic cancer cell bioreactor media using an exemplary embodiment of a method of the application after labeling using a cell-penetrating peptide conjugated to Qdot-655 (Qtracker@-655) and quantification using fluorescent nanoparticle tracking analysis.

Figure 9:
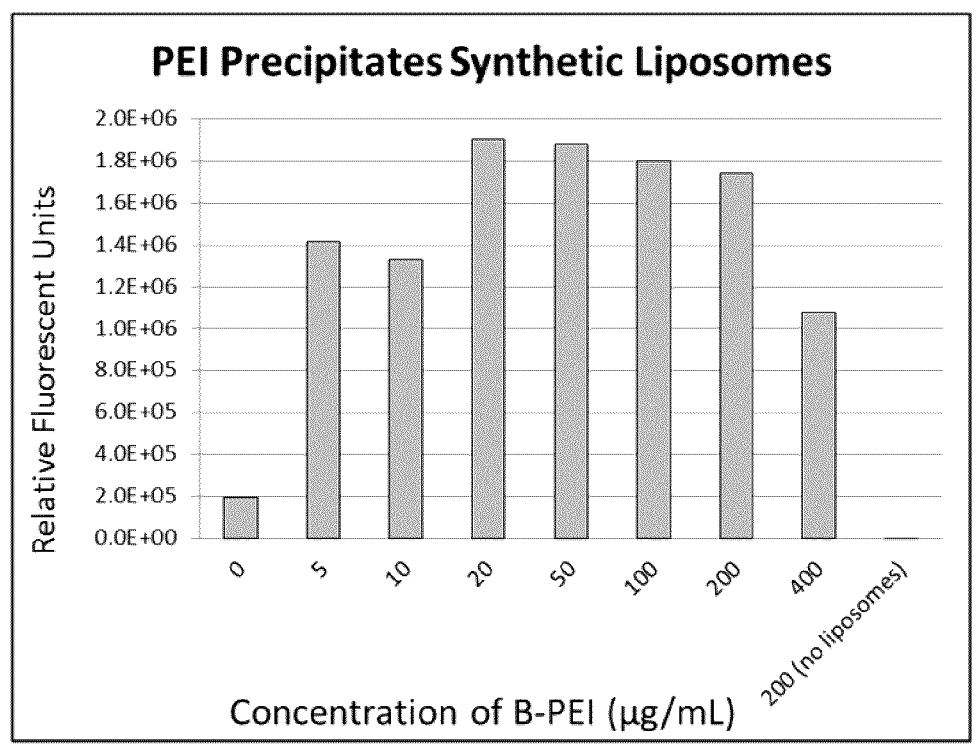

FIG. 9 shows a graph demonstrating the relative fluorescent units using fluorescent spectroscopy of neutrally-charged 100 nm DOPC/CHOL liposomes labeled with Fluorescein DHPE and isolated using an exemplary embodiment of a method of the application.

Figure 10:
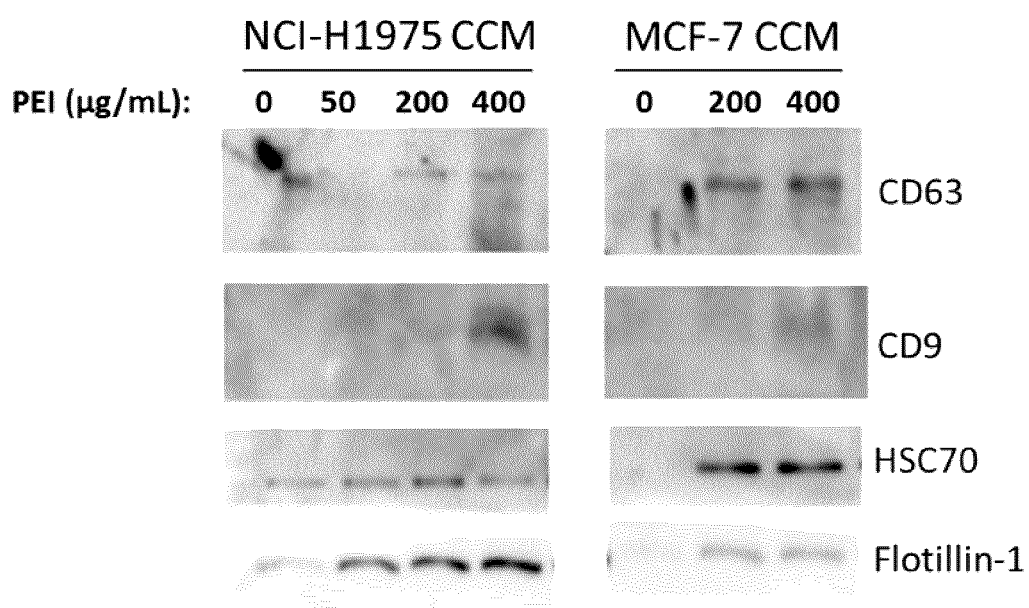

FIG. 10 shows an immuno-blot demonstrating the detection of extracellular vesicle protein markers (CD63, CD9, HSC70, and Flotillin-1) isolated using an exemplary embodiment of a method of the application, from conditioned cell media collected from either NCI-H1975 non-small cell lung cancer cells or MCF-7 breast cancer cells.

Figure 11:
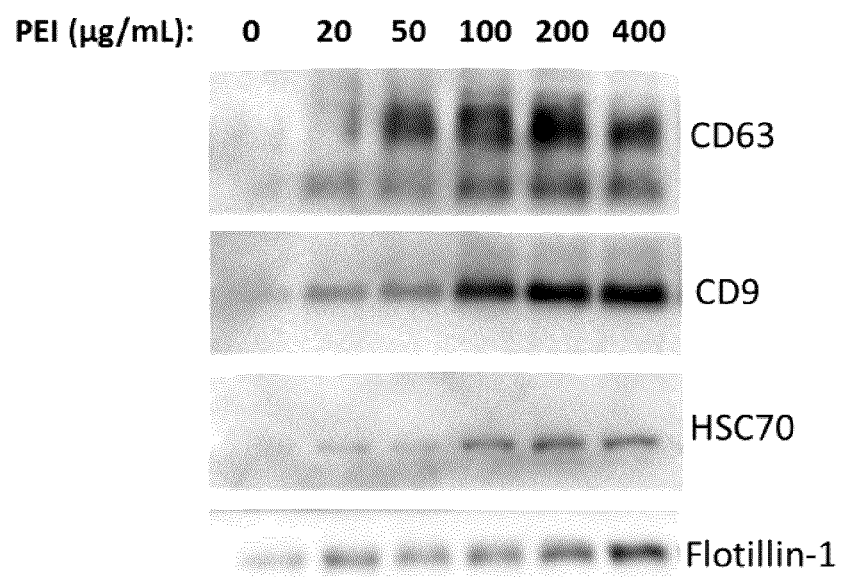

FIG. 11 shows an immuno-blot demonstrating the detection of extracellular vesicle protein markers (CD63, CD9, HSC70, and Flotillin-1) isolated using an exemplary embodiment of a method of the application, from human plasma.

Figure 12:
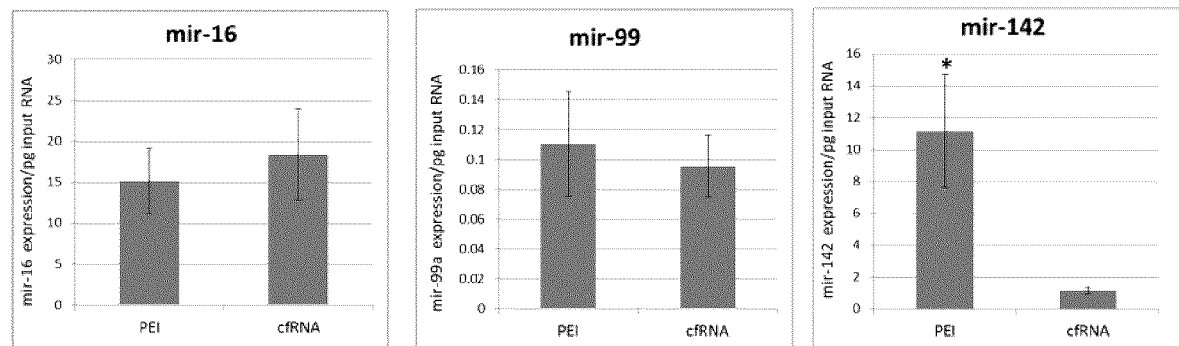

FIG. 12 shows the expression of three different miRNAs, including mir-142-3p, an miRNA known to be enriched in EVs, which were isolated using an exemplary embodiment of a method of the application, from human plasma.

Figure 13:
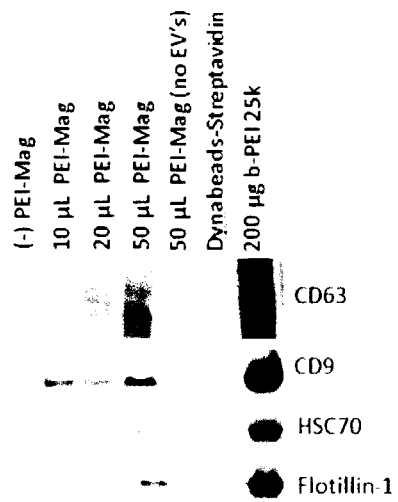
Figure 13:
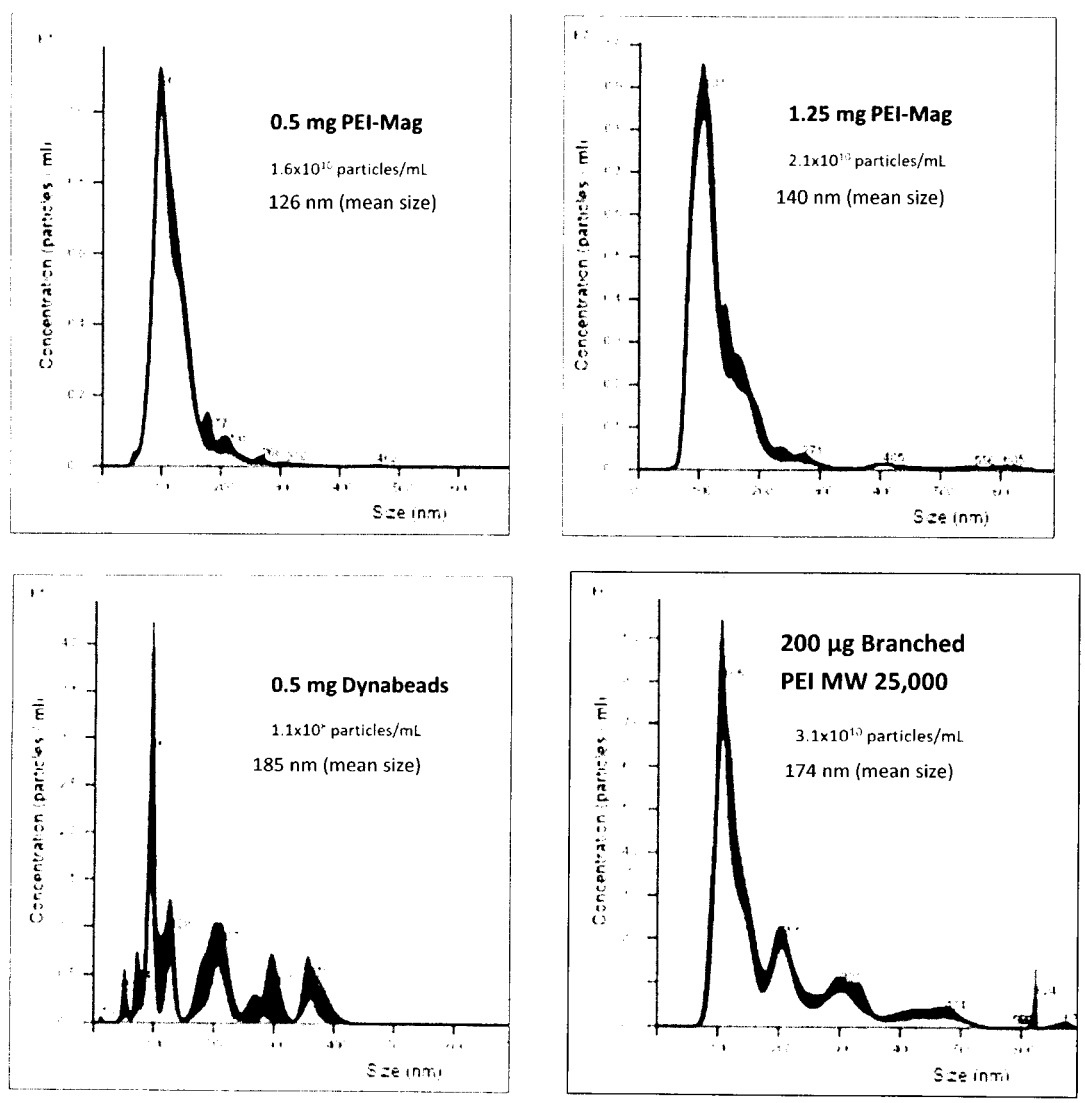

FIG. 13 shows A) an immuno-blot demonstrating the detection of extracellular vesicle protein markers (CD63, CD9, HSC70, and Flotillin-1) and B) a nanoparticle tracking analysis of EV's isolated using an exemplary embodiment of a method of the application from media collected from PANC10.05 pancreatic cancer cells growing in a bioreactor.

Figure 14:
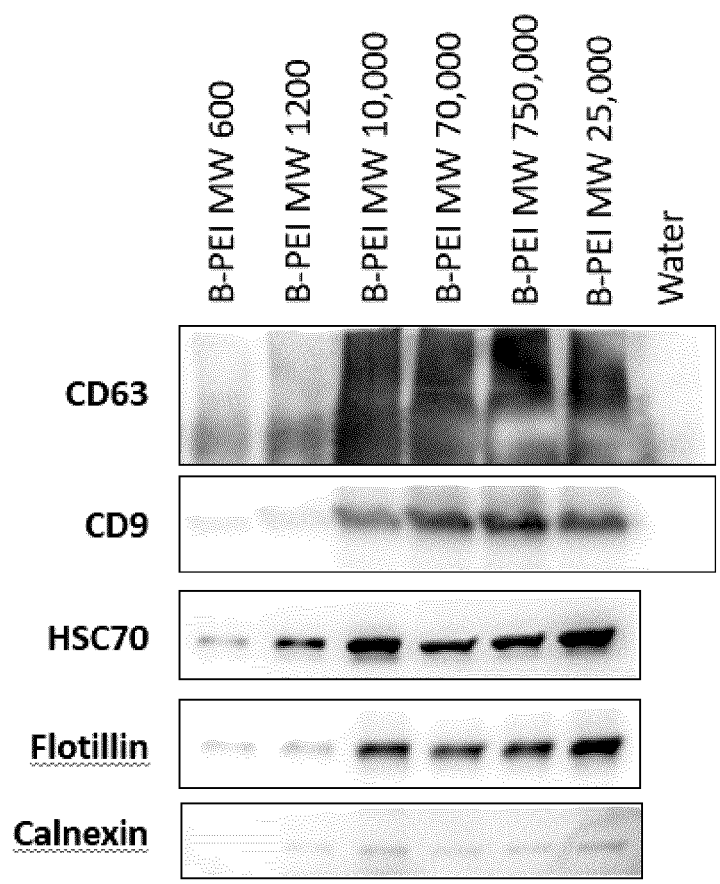

FIG. 14 shows an immuno-blot demonstrating the detection of extracellular vesicle protein markers (CD63, CD9, HSC70, and Flotillin-1) as well as absence of a non-EV marker (Calnexin) in EVs isolated using an exemplary embodiment of a method of the application, from media collected from PANC10.05 pancreatic cancer cells growing in a bioreactor using.

Figure 15:
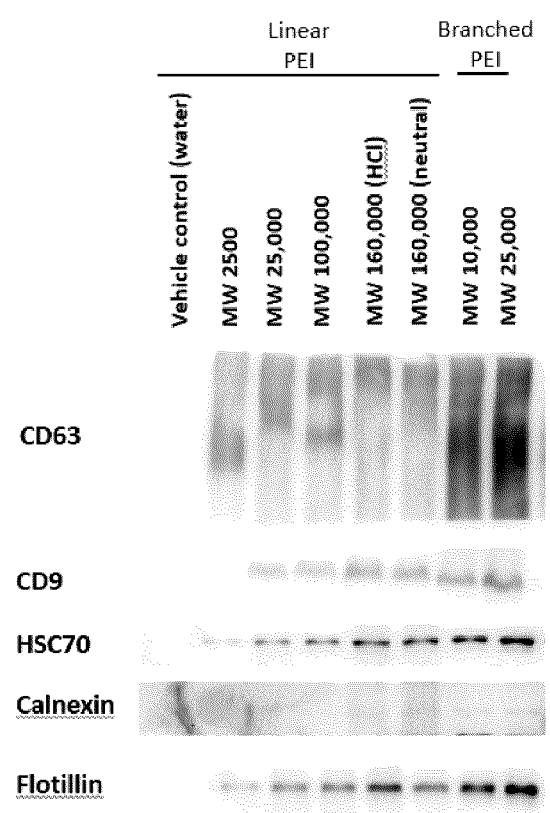

FIG. 15 shows an immuno-blot demonstrating the detection of extracellular vesicle protein markers (CD63, CD9, HSC70, and Flotillin-1) as well as absence of a non-EV marker (Calnexin) in EVs isolated using an exemplary embodiment of a method of the application, from media collected from PANC10.05 pancreatic cancer cells growing in a bioreactor.

Figure 16:
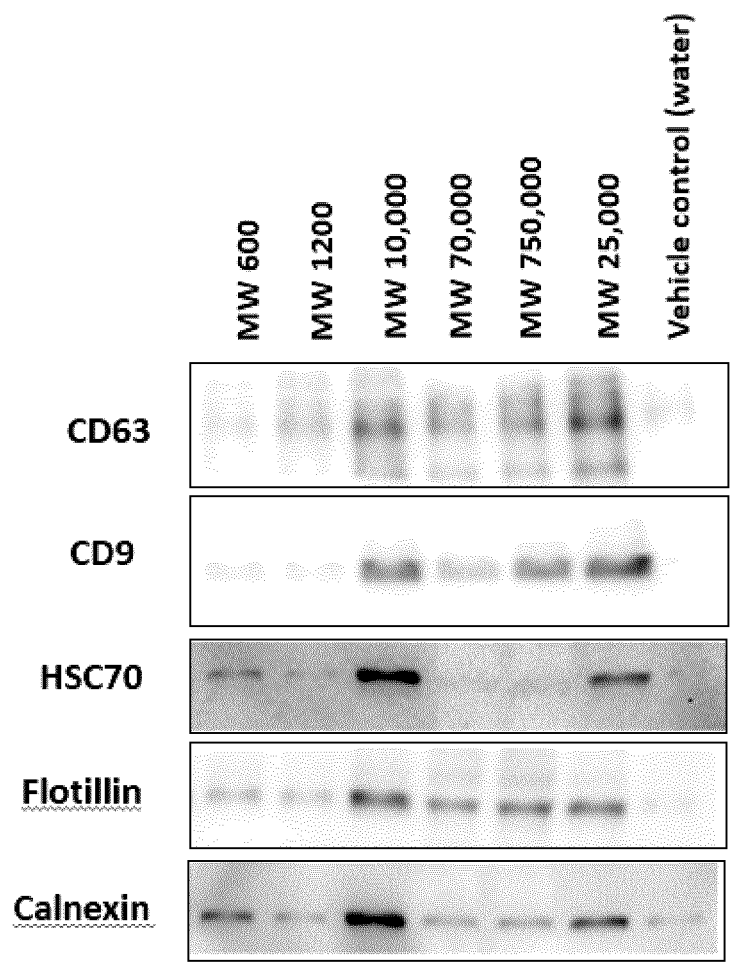

FIG. 16 shows an immuno-blot demonstrating the detection of extracellular vesicle protein markers (CD63, CD9, HSC70, and Flotillin-1) as well as absence of a non-EV marker (Calnexin) from EVs isolated using an exemplary embodiment of a method of the application from healthy human plasma.

Figure 17:
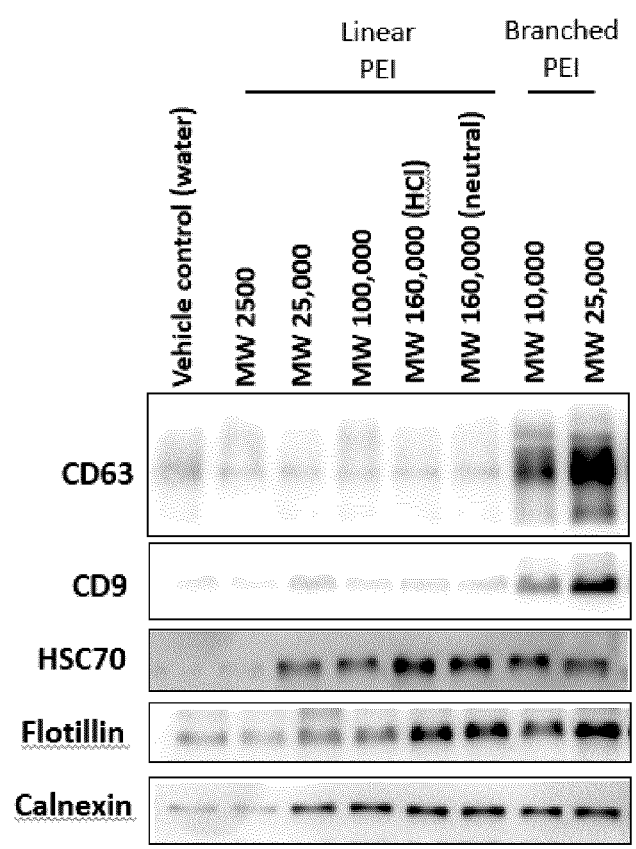

FIG. 17 shows an immuno-blot demonstrating the detection of extracellular vesicle protein markers (CD63, CD9, HSC70, and Flotillin-1) as well as absence of a non-EV marker (Calnexin) from EVs isolated using an exemplary embodiment of a method of the application, from healthy human plasma.

Figure 18:
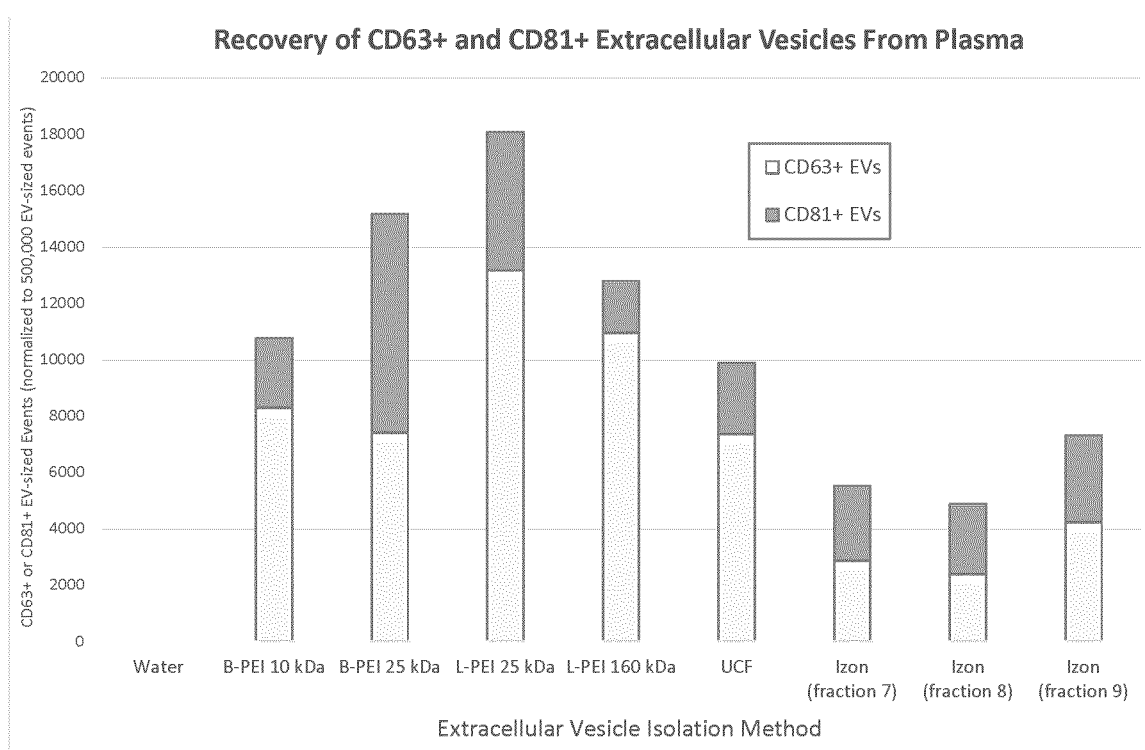

FIG. 18 shows a graph demonstrating flow cytometry-based quantification of CD63-positive or CD81-positive EVs isolated using an exemplary embodiment of a method of the application, from healthy human plasma.

Figure 19:
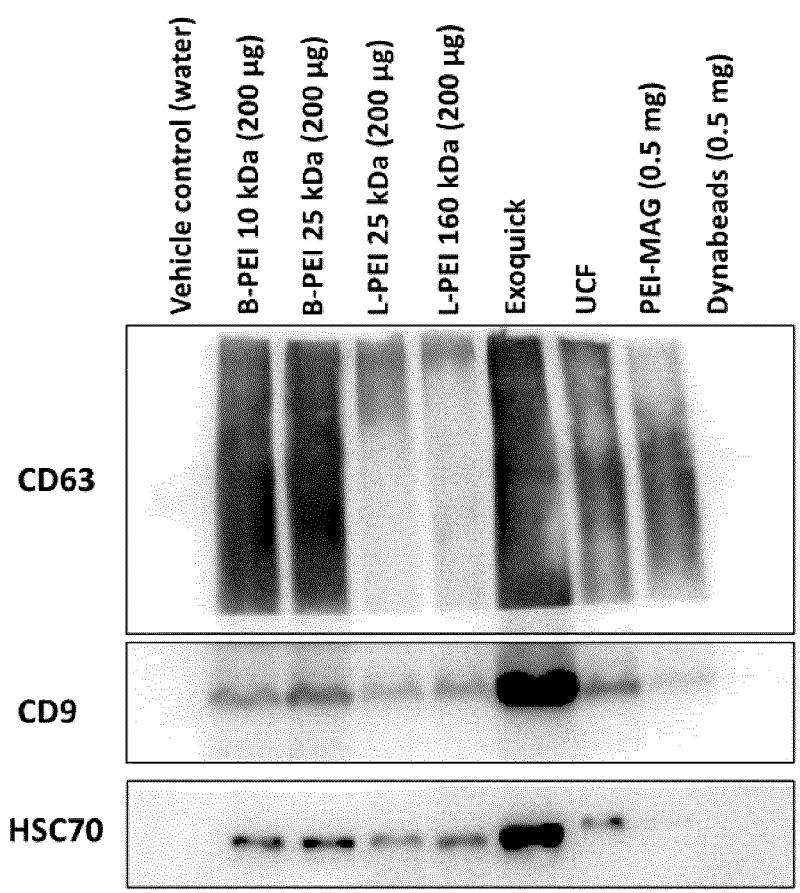

FIG. 19 shows an immuno-blot demonstrating the detection of extracellular vesicle protein markers (CD63, CD9, HSC70) from EVs isolated using an exemplary embodiment of a method of the application, from media collected from PANC10.05 pancreatic cancer cells growing in a bioreactor in comparison to other standard EV isolation protocols.

Figure 20:
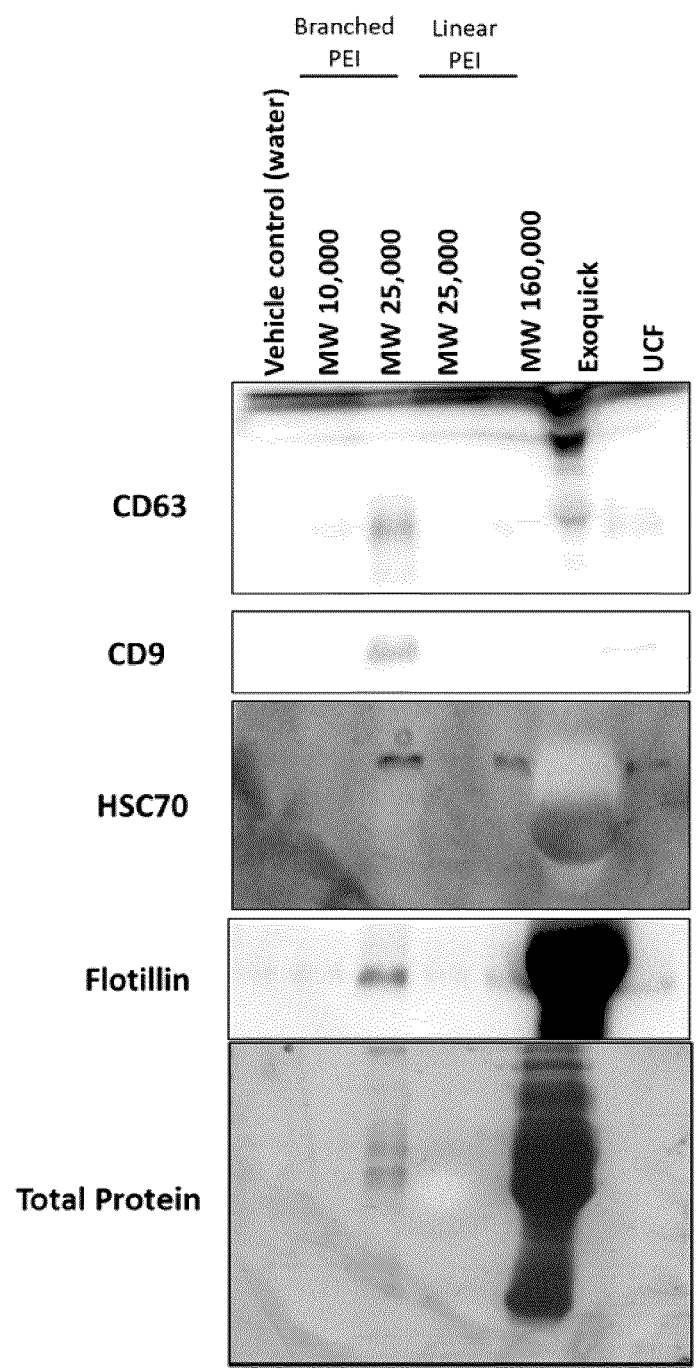
Figure 21:
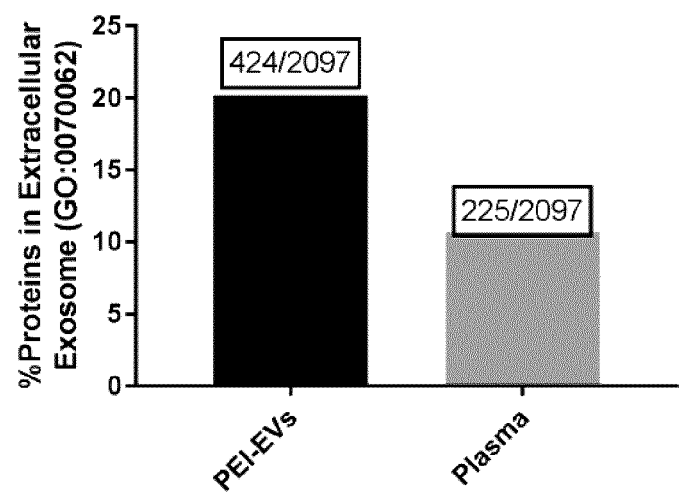

FIG. 20 shows an immuno-blot demonstrating the detection of extracellular vesicle protein markers (CD63, CD9, HSC70, Flotillin) from EVs isolated from healthy human plasma using an exemplary embodiment of a method of the application, in comparison to other standard EV isolation protocols FIG. 21 shows a graph demonstrating enrichment of EV proteins from plasma by mass spectrometry using an exemplary embodiment of a method of the application.

DETAILED DESCRIPTION

I. Definitions

Unless otherwise indicated, the definitions and embodiments described in this and other sections are intended to be applicable to all embodiments and aspects of the present application herein described for which they are suitable as would be understood by a person skilled in the art.

The present application refers to a number of chemical terms and abbreviations used by those skilled in the art. Nevertheless, definitions of selected terms are provided for clarity and consistency.

As used herein, the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process/method steps.

As used herein, the word "consisting" and its derivatives, are intended to be close ended terms that specify the presence of stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

As used in this application, the singular forms "a", "an" and "the" include plural references unless the content clearly dictates otherwise. For example, an embodiment including "a buffer" should be understood to present certain aspects with one buffer or two or more buffers. In embodiments comprising an "additional" or "second" component, such as an additional or second buffer, the second component as used herein is chemically different from the other components or first component. A "third" component is different from the other, first, and second components, and further enumerated or "additional" components are similarly different.

The term "and/or" as used herein means that the listed items are present, or used, individually or in combination. In effect, this term means that "at least one of" or "one or more" of the listed items is used or present.

The term "pharmaceutical composition" as used herein refers to a composition for pharmaceutical use.

The term "for pharmaceutical use" means compatible with the treatment of a subject.

The term "subject" as used herein refers to the source organism from where a sample is obtained and/or the target organism for treatment and includes all unicellular and multicellular organisms.

The term a "therapeutically effective amount" refers to a quantity of a substance sufficient to, when administered to a subject, effect beneficial or desired results, including clinical results, and, as such, a "therapeutically effective amount" or synonym thereto depends upon the context in which it is being applied. A "therapeutically effective amount" is intended to mean that amount of a substance that is sufficient to treat, prevent or inhibit one or more pathological conditions. The amount of a given substance that will correspond to such an amount will vary depending upon various factors, such as the given substance, the pharmaceutical composition, the route of administration, the type of pathological condition, the identity of the subject being treated, and the like, but can nevertheless be routinely determined by one skilled in the art.

The term "pathological condition" as used herein refers to any disease, disorder or condition that is to be treated or receive a treatment.

The term "treated", "treating" or "treatment", as used herein, and as is well understood in the art, means an approach for achieving results, including clinical results, which are either desired and/or beneficial. Treatment that results in clinical benefits can include, but is not limited to, alleviation or amelioration of one or more symptoms or conditions associated with the pathological condition, reducing the extent or spread of the pathological condition, stabilization of the pathological condition, delay or deceleration of progression of the pathological condition, amelioration or palliation of the pathological condition, reduced incidence of the pathological condition, reduce reoccurrence, and either partial or total remission, whether detectable or undetectable. "Treated", "treating" and "treatment" can also mean prolonging survival as compared to expected survival if not receiving treatment, or prophylactic treatment.

Figure 1:
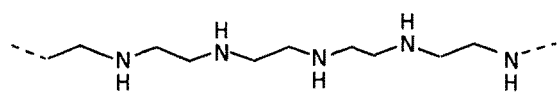
FIG. 1 shows a depiction of the general structure of either, an exemplary linear PEI fragment, an exemplary branched PEI fragment, or an exemplary generation 4 PEI dendrimer.
Figure 1:
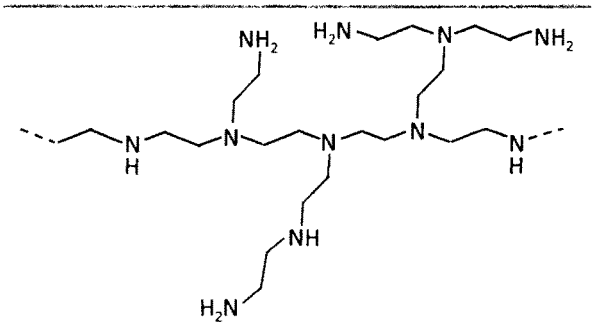
Figure 1:
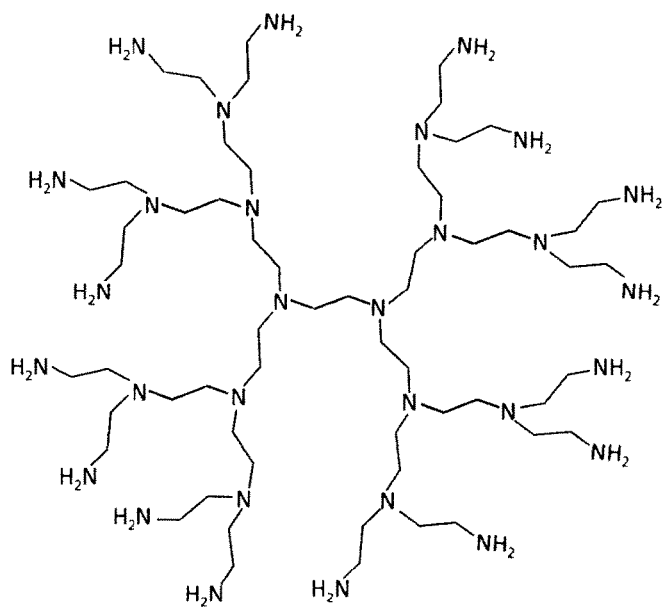

The term "polyethylenimine" or "PEI" refers to a group of hydrophilic cationic polymers that encompass polymers in a linear form with a molecular weight (MW) ranging from approximately 2500 to 250,000 Da, branched forms with a MW ranging from approximately 600 to 750,000 Da, and dendrimer forms comprising generations 1 to 6. As used herein, "polyethylenimine" refers in its ordinary sense to polymers with repeating units composed of an amine group and a two-carbon aliphatic ($CH_2CH_2$) spacer. The term polyethylenimine includes those having typically 10 or more repeated units. Linear polyethylenimine refers to a polymer with all secondary amines (refer to FIG. 1), branched polyethylenimine refers to a polymer containing primary, secondary, and tertiary amino groups (refer to FIG. 1). Dendrimer forms of polyethylenimine refer to repetitively radially branched polymers containing primary and tertiary amine groups and can be intact or fractured.

The term "amine" as used herein refers to a functional group comprising a nitrogen atom bonded to zero, one or two hydrogen atoms with the remaining atoms bonded to the nitrogen being $sp^3$-hybridized carbon atoms.

The term "polymer" as used herein refers to a large molecule or macromolecule composed of many repeated monomeric units wherein the number of repeated units may be variable and dependent on the particular polymer in question.

The term "extracellular vesicle" or "EV" as used herein refers to a membrane-bound vesicle wherein at least a portion of the plasma membrane of the extracellular vesicle is derived directly from a cell, whether it be from a uni- or multi-cellular organism. Depending on the manner of generation of the extracellular vesicle (e.g. membrane inversion, exocytosis, fusion of a multivesicular body with the plasma membrane, budding from plasma membrane, etc.), the EVs contemplated herein may exhibit different protein markers, nucleic acid cargo, metabolites, and surface/lipid characteristics. EVs are also referred to as "exosomes", "exosome-like", "microsomes", "microvesicles", "secretory exosomes", "oncosomes", "membrane vesicles", "apoptotic bodies", "argosomes", and "microparticles", which are included within the definition.

The term "liposome" as used herein refers to a synthetic lipid-bound vesicle that can be created from various lipids, where the nature of the lipids constituting the liposome affects the characteristics of the resulting liposome, including shape, rigidity, size, and charge. Liposomes may be created from lipids including, for example, cholesterol, various phospholipids, phosphatidylethanolamine, distearoylphosphatidylethanolamine, etc. Liposomes can be used as a drug carrier by encapsulating biological molecules or drugs.

The term "isolation", "isolating", or "capture" as used herein means to separate, enrich, precipitate, immobilize, and/or purify EVs from a particular biological sample.

By "isolation of EVs" as used herein, it is meant that the EV's and EV-associated biological material are isolated. By "associated" it is meant that the biological material is either internally or externally located in or on the EV's and is isolated along with the EVs.

The term "sample" or "biological sample" or "biological fluid" as used herein refers to a material or mixture of materials containing EVs and includes biological samples and clinical samples that contain EVs for isolation.

The term "contacting" or "contact" as used herein refers to the manner in which the one or more polyethylenimines are mixed, blended or incubated with a sample such that the polyethylenimine and EVs in the sample form a EV-polyethylenimine complex.

The term "extracellular vesicle-polyethylenimine complex" or "EV-polyethylenimine complex" as used herein refers to the complex of material that is formed and then precipitated, pelleted, or captured from a biological sample following contact of the sample with the one or more polyethylenimines, or one or more polyethylenimines immobilized on a solid support. The complex is expected to contain both EVs (and EV-associated material) and one or more polyethylenimines.

The term "conditions for the isolation of the EVs" as used herein refers to the conditions that are appropriate for the isolation, precipitation, pelleting or capture of EVs from the sample as described in greater detail hereinbelow, and may include, but are not limited to, conditions for sample preparation (e.g. pre-clearing by centrifugation, filtration, dilution, etc.), concentration of polyethylenimine, duration of contact, temperature, identity of buffers for dilution or washing, pH, centrifugation speeds, identity of buffer or lysis buffer used to re-suspend EV-polyethylenimine complex or pellet, and identity of solid support, if used, for isolation and/or separation.

The term "suitable" as used herein means that the selection of the particular conditions would depend on the specific manipulation to be performed, and the identity of the substances involved, but the selection would be well within the skill of a person trained in the art. Unless otherwise indicated, all methods and assays described herein are to be conducted under conditions sufficient to achieve the desired result. A person skilled in the art would understand that all such conditions, including, for example, pre-treatment or pre-clearing treatments, pH, concentrations, solvent, time, temperature, pressure, and/or molar, volume or weight ratios, can be varied to optimize the desired result and is within their skill to do so.

The term "method of the application" as used herein refers to a method of isolating EVs using one or more polyethylenimines, including all of the various embodiments thereof, described herein.

The term "microfluidics" as used herein refers to an apparatus for precise manipulation of liquids in very small volumes, typically in the 100 nanoliters to 100 microliters range.

The term "marker" or "biomarker" as used herein refers to biologically-derived molecules or biological and/or cellular events that are correlated to a specific pathological condition and are intended to help in understanding, for example, patient stratification, degree of risk for disease occurrence or progression, type of pathological condition, monitoring treatment outcome (e.g. stabilization of disease, remission, relapse, or progression), and sensitivity or resistance to a specific drug or therapeutic regimen. A person skilled in the art would understand that a biomarker is a characteristic that is objectively measured and evaluated as an indicator of normal biological processes, pathogenic processes, or pharmacological responses to a therapeutic intervention (Biomarkers Definitions Working Group. Biomarkers and surrogate endpoints: preferred definitions and conceptual framework. Clin Pharmacol Ther. 2001; 69: 89-95).

The term "conditioned media" as used herein refers to experimental samples derived from media taken from living cultured cells that are regularly passaged (e.g. detached from growing surface and transferred to a new growing vessel before cells get crowded and start to grow on top of each other) and grown in a monolayer using techniques well known to those skilled in the art.

The term "bioreactor media" as used herein refers to experimental samples derived from media taken from living cultured cells grown in bioreactors that utilize membrane technology to separate the cell cultivation area from the media chamber using techniques well known to those skilled in the art. This set-up allows cells to be grown for a long period without passaging and to produce cell media that is enriched in EVs.

The term "fractured" refers to the random disruption of branched forms of molecules, as used herein in referring to fractured dendrimers, where heat is typically the method used to fracture the molecule.

The term "surface plasmon resonance" or "SPR" as used herein describes a method to study the interaction between two macromolecules. Typically, one of the macromolecules to be studied is immobilized on the surface of a sensor chip while the other is passed through a microfluidics system to the chip surface. Changes in mass at the sensor surface can be used to monitor interactions between the two macromolecules.

The term "macromolecule" as used herein describes a very large molecule, typically a molecule containing at least 1000 atoms and more likely thousands to millions of atoms. Macromolecules are typically the result of polymerization of molecular subunits. Examples of macromolecules include, for example, proteins, antibodies, liposomes, nucleic acids, and polymers. Exemplary molecular weights include, but are not limited to about 10 kDa to about 4000 kDa.

The term "magnetic bead" as used herein describes any particle with magnetic properties, whereby the composition, shape and size of the magnetic core can affect its magnetic properties. The magnetic core may be composed of various magnetic materials, including iron and cobalt, and may be coated with various materials and functional groups, and may range in size from <50 nm to >1 µm. By applying a magnetic field, the magnetic beads, and any associated biological materials, will be attracted towards the magnet, separating them from the unwanted material in the biological sample.

II. Methods of the Application

Methods for Isolation EVs and Kits Therefore

Disclosed herein are methods and compositions using polyethylenimine (PEI) to isolate EVs from biological samples. The methods to isolate EVs described in the present application do not depend on methods, such as filtration or high-speed centrifugation, which may damage isolated EVs by centrifugal forces or shear stresses. The methods described herein isolate EVs from biological samples with greater ease, and equal or superior efficiency in comparison to other EV precipitation methods, such as ExoQuick™ and ultracentrifugation. Furthermore, the methods described in the present application are scalable and high yields of EVs are possible. The EVs isolated using the methods described herein are also of higher purity than those achieved by other EV precipitation methods, such as ExoQuick™. Therefore, PEI can be used to isolate EVs that are suitable for use in therapeutic applications. Depending on its intended use, EVs used in therapeutics may be isolated from unmodified cells containing native EVs or genetically-modified cells which release EVs containing trans-gene products[10].

PEI is soluble, due to intra-chain repulsion, in 100-150 mM NaCl and at neutral pH[56], which is the typical NaCl concentration and pH range in cell media and plasma. It has unexpectedly been found that EVs and liposomes, in particular 100 nm neutrally-charged liposomes, can be precipitated using polyethylenimine using low-speed (benchtop) centrifugation from biofluids. Although the ability of PEI polyplexes to transfect cells has been demonstrated to require heparin sulfate, proteoglycans and glycosaminoglycans[42,43], and these proteins have been found on the cell surface of exosomes, the unexpected ability of PEI to precipitate neutrally-charged synthetic liposomes, which completely lack proteins, negates the binding of PEI to these cell surface proteins as the mechanism required for extracellular vesicle precipitation by PEI as described by the methods of the present application.

Furthermore, in spite of its known ability to bind nucleic acids, PEI was found to be unable to recover cell-free DNA (cfDNA) from plasma samples (Table 3), although PEI was able to recover RNA and, in particular, EV-associated miRNA. This suggests that PEI has an unexpected preference for associating with EVs compared to nucleic acids in complex biological samples. The ability of PEI to recover uncharged liposomes and EVs from complex biological samples, but not DNA, and to recover only a subset of EV-associated RNA, suggests that PEI has a hitherto unrecognized ability to precipitate and/or capture liposomes (including neutrally charged liposomes) and EVs that is not dependent on simple charge-based interactions.

The ability of PEI to recover EV-associated RNA species as opposed to cell-free RNA (cfRNA) may be of great benefit. Most miRNAs present in serum are found in aggregation with protein complexes containing Argonaut2 rather than inside EVs[24]. However, certain specific miRNAs, such as mir-142-3p, have been found to be enriched in the EV-fraction of plasma[24]. Furthermore, it is the EV-associated miRNA species that retain important inter-cellular communication functions and which are involved in varied biological processes, from inflammation and immune system regulation to tumour development and drug resistance[57-61]. In light of this, EV-associated RNA species, and miRNAs in particular, are considered to be better biomarkers than other circulating miRNAs[62-64] and the ability of PEI to specifically recover this population of miRNAs make it useful for the identification of novel biomarkers for the development of diagnostic tests and assays.

Accordingly, in one embodiment the present application includes a method for the isolation of EVs from a sample containing EVs, comprising contacting the sample with one or more polyethylenimines under conditions for the isolation of EVs.

In some embodiments, the conditions for the isolation of EVs comprise:
(i) contacting the sample with the one or more polyethylenimines to form an EV-polyethylenimine complex; and
(ii) separating the EV-polyethylenimine complex from the sample.

The use of polyethylenimine allows for quick isolation of EVs using, for example, low-speed benchtop centrifugation with quicker processing times and improved purity over current precipitation methods. The ease of processing and the ability to coat PEI onto magnetic beads or other solid matrices lends this method to clinical adaptation for detection of EV-related biomarkers[18,61-63].

In some embodiments, EVs are isolated from freshly collected biological samples, or samples that have been stored, either at room temperature, refrigerated, or frozen. In some embodiments, the samples have been preserved or fixed to prolong storage. In some embodiments, the EVs are membrane-bound vesicles having a diameter (or largest dimension) of between about 10 nm to about 3000 nm, or between about 40 nm and about 1000 nm, wherein at least a portion of the plasma membrane of the extracellular vesicle is derived directly from a cell from a subject.

In some embodiments, the sample is obtained from human subjects, or from human cell lines. In some embodiments, the sample is obtained from an organism such as, but not limited to, an animal, fish or bird. In some embodiments, the animal is a companion animal or livestock. In some embodiments, the animal is a wild animal. In some embodiments, the sample is from a subject that is suspected of having, or has been diagnosed with, one or more pathological conditions.

In some embodiments the sample is a bodily fluid (such as blood, blood serum, plasma, urine, milk, semen, sweat, cerebral spinal fluid, saliva, ascites, tears, amniotic fluid, joint fluid and malignant effusions) or tissue biopsy or the fluid, media, exudates or discharges from any organism.

In some embodiment, the sample is first treated to prepare it for isolation of the EVs, for example, to remove debris or interfering substances (e.g. albumin), using methods known to those skilled in the art. In some embodiments, such treatments are called "pre-clearance treatments". In some embodiments, the pre-clearance treatments comprise one or more of: filtration, ultrafiltration, centrifugation, sterilization, treatment with an enzyme and treatment with a biocide. In some embodiments, the enzyme is selected from one or more of a protease inhibitor, proteases, DNASE and RNASE.

In some embodiments, the sample is pre-cleared to comprise large (>1 micron) particles by centrifuging at about 17,000 g, for about 15 minutes. In some embodiments, the sample is pre-cleared by passing it through a filter, for example, a 0.45 µm or 0.8 µm filter, to remove unwanted material from the sample. In some embodiments, for example, after a plasma sample has been obtained from a patient, the plasma sample is treated, for example with thrombin, which converts fibrinogen to fibrin, allowing it to be pre-cleared by a simple centrifugation step.

Suitable polyethylenimines for precipitation of EVs from samples include linear forms with a molecular weight (MW) ranging from about 2500 to about 250,000 Da, branched forms with a MW ranging from about 600 Da to about 750,000 Da, and dendrimer forms comprising generations 1 to 6, whether intact or fractured. In some embodiments, the polyethylenimine has an average molecular weight of at least 600 Da, at least 1200 Da, at least 1800 Da, at least 2000 Da, at least 10,000 Da, at least 25,000 Da, at least 40,000 Da, at least 60,000 Da, at least 70,000 Da, at least 160,000 Da, at least 250,000 Da, or at least 750,000 Da or above. In some embodiments, the polyethylenimine is a branched polyethylenimine having a MW of 10,000 Da, 25,000 Da, 70,000 Da or 750,000 Da. In some embodiments, the polyethylenimine is a branched polyethylenimine having a MW of 10,000 Da or 25,000 Da. In some embodiments the polyethylenimine is branched polyethylenimine having a MW of 10,000 Da. In some embodiments the polyethylenimine is branched polyethylenimine having a MW of 25,000 Da. In some embodiments, the polyethylenimine is a linear form having a MW of 25,000 Da. In some embodiments, the polyethylenimine is a linear form having a MW of 160,000 Da.

Using a non-toxic form of polyethylenimine means that, using methods of the application, EVs can be isolated while being compatible for use in therapeutics. In some embodiments the non-toxic form of polyethylenimine is linear 22,000 Da polyethylenimine. In some embodiments, the non-toxic form of polyethylenimine is linear 25,000 Da polyethylenimine.

The polyethylenimine can be from any source. In some embodiments the polyethylenimine is synthetic, i.e. is prepared using a synthetic method rather than isolated from a natural source. In some embodiments, the polyethylenimine is subjected to one or more processing steps prior to use in the method of the application. In some embodiments these processing steps are one or more of purification, chemical-functionalization, attachment to solid supports, and the like. Such methods are known to those skilled in the art. Any suitable method known in the art for synthesizing, preparing, and/or purifying suitable polyethylenimines can be employed.

In some embodiments, the polyethylenimine is bonded to a solid support which aids in the separation of the EVs from the sample, but is not used for the isolation step. In some embodiments, the solid support is polystyrene or glass. In some embodiments, the polyethylenimine is bonded to a solid support which aids in the separation of the EVs from the sample, and in the isolation of EVs. In some embodiments, the solid support comprises magnetic beads coated with one or more polyethylenimines which are easily isolated using a magnetic field. In some embodiments, the magnetic beads comprise 10 nm to 10 µm in diameter particles with a magnetite core and a shell of polyethylenimine. In some embodiments, the magnetic beads comprise 150 nm particles with a magnetite core and a shell of polyethylenimine. In some embodiments, the magnetic beads comprise any magnetic core, from 10 nm to 10 µm in diameter, and be coated with one or more linear, or branched polyethylenimines, or combinations thereof.

In some embodiments, the one or more polyethylenimines are conjugated to a ligand which aids in the separation of the EVs from the sample. In some embodiments, the ligand comprises a biotin moiety. When the polyethylenimine is conjugated a biotin moiety, the EVs in a sample may then be isolated by contacting the biotin-conjugated polyethylenimine with the sample, followed by contacting with a biotin-binding protein or a solid support comprising a biotin-binding protein. In some embodiments, the biotin-binding protein is selected from avidin, streptavidin, or other biotin-binding proteins. In some embodiments, the solid support is polystyrene, glass or paramagnetic particles. Methods of conjugating biotin-binding proteins to solid supports are well known to those skilled in the art.

In some embodiments, one or more polyethylenimines are fixed to a solid support comprising silicones (for example polydimethylsiloxane) or other surfaces of a microfluidic apparatus to aid in the isolation of EVs from the sample. In some embodiments, the microfluidics apparatus further comprises, for example, downstream molecular analysis components such as components that comprise reagents for the polymerase chain reactions (PCR) to identify nucleic acids (e.g. gene-specific mutations or particular miRNAs) and/or antibodies to identify proteins. In some embodiments, the microfluidic apparatus is a surface plasmon resonance (SPR) apparatus.

In some embodiments, one or more polyethylenimines are fixed the surface of, for example, a sensor, in some instances a surface plasmon resonance biosensor, to aid in the study of biomolecular interactions between EVs and other molecules, including, but not limited to, proteins, antibodies, lipids, drugs, polyethylene glycol, and biofluids.

In some embodiments, the one or more polyethylenimines are in a solution. In some embodiments the solution is an aqueous solution. In some embodiments, the solution is a buffer. In some embodiments, the buffer is selected from borate, phosphate, acetate, citrate, and TRIS buffers. The pH of the buffer may be any pH that is compatible with the polyethylenimine(s) intended to be put into solution. The concentration of the polyethylenimine(s) solution may be any concentration compatible with the intended one or more polyethylenimines to be put into solution. In some embodiments, the one or more polyethylenimines solution has a concentration ranging from about 1 µg/mL to about 20 mg/mL or from about 1 mg/mL to about 10 mg/mL. In some embodiments, the one or more polyethylenimines solution is filter sterilized through a 0.2 µm filter to sterilize the solution and remove any unsolubilized polyethylenimine.

A variety of buffers may be used for incubation with the biological sample prior to precipitation of EVs, including, but not limited to, borate, phosphate, acetate, citrate, and TRIS buffers. The pH of the buffer may be any pH that is compatible with the biological sample. In some embodiments, the buffer for the sample has a pH ranging from about pH 4 to about pH 11 or about pH 6 to about pH 8.

The salt concentration of the sample may be any concentration compatible with the sample. In some embodiments, the salt concentration is about 10 mM to about 1000 mM or about 100 mM to about 200 mM.

The amount of the one or more polyethylenimines to be used in the methods of the application may be any amount that is compatible with the sample and that will isolate the EVs from the sample. In some embodiments, the one or more polyethylenimines are used in an amount that is about 1 µg/mL to about 1000 µg/mL or about 20 µg/mL to about 400 µg/mL in the total mixture of sample and one or more polyethylenimines.

The sample size used to isolate EVs using methods described herein depends upon the concentration of useful EVs within the sample, the method of the present application used for their isolation, and the intended downstream application of isolated material. In some embodiments, the methods of the application are used to isolate EVs from small sample sizes using a microfluidic device where the sample size is about 2 microliters to about 100 microliters. In some embodiments, the sample size is from 100 microliters to more than 10 milliliters or more.

The contacting time used to create an association between EVs and the one or more polyethylenimines can be any time compatible with the biological sample. In some embodiments, the contacting time is about 1 minute to about 24 hours. In some embodiments, the contacting time is about 10 minutes to about 10 hours. In some embodiments, the contacting time is about 30 minutes to about 2 hours. In some embodiments, the contacting time is about 60 minutes. In some embodiments, the contacting is performed with agitation, rotation and/or stirring. In some embodiments, the contacting is performed with end-over-end rotation.

In some embodiments, the contacting is performed at any temperature compatible with the biological sample. In some embodiments, the contacting is performed at a temperature of about 0° C. to about 40° C. or at about ambient or room temperature.

In some embodiments, the EV-polyethylenimine complex is separated using any method that is compatible with the EVs and the complex. In some embodiments, the EV-polyethylenimine complex is separated by pelleting, for example using centrifugation.

In some embodiments, the centrifugal force used to pellet the EV-polyethylenimine pellet is any one compatible with the biological sample. In some embodiments, the centrifugal force is about 20,000 g or less. In some embodiments, the centrifugal force is about 17,000 g to initially precipitate the EV-polyethylenimine pellet and about 13,000 g to precipitate the EV-polyethylenimine pellet between washes.

In some embodiments, the centrifugation time used to pellet the EV-polyethylenimine pellet is any time compatible with the biological sample and the complex. In some embodiments, the centrifugation time is about 15 minutes to initially precipitate the EV-polyethylenimine pellet and about 2 minutes to precipitate the EV-polyethylenimine pellet between washes. In some embodiments, the EV-polyethylenimine pellet is washed by removing the sample from the pellet following centrifugation and replacing the buffer with a washing liquid. In some embodiments this washing liquid is water or a buffer, including, but not limited to, borate, phosphate, acetate, citrate, and TRIS buffers. In some embodiments, this washing buffer is Dulbecco's phosphate buffered saline. The pH of the buffer may be any pH that is compatible with the EV-polyethylenimine complex and downstream applications. In some embodiments, the pH of the buffer is about pH 4 to about pH 10, or about pH 6 to about pH 8. In some embodiments, the washing buffer includes a detergent such as, but not limited to, digitonin, Triton X-100™ or Tween-20™, for example, in order to reduce non-specific protein interactions. In some embodiments, the EV-polyethylenimine pellet is pelleted in between washes using a centrifugal force of about 13,000 g. However, in other embodiments, the centrifugal force may be any that is compatible with the isolation of EVs from the biological sample. In some embodiments, centrifugation for about 2 minutes is used to precipitate the EV-polyethylenimine pellet between washes. However, in other embodiments, the centrifugation time may be any that is compatible with the isolation of EVs from the biological sample.

In some embodiments, when the one or more polyethylenimines are conjugated to a solid support, the EV-polyethylene complex is separated using methods to capture the solid support. For example, when the one or more polyethylenimines are conjugated to a solid support comprising magnetic properties, the EV-polyethylenimine complex may be isolated using a magnetic field. As a further example, when the one or more polyethylenimines are conjugated to a solid support comprising a ligand, the EV-polyethylenimine complex may be isolated using affinity capture methods.

In some embodiments, the isolated EV-polyethylenimine complex is treated to release the EVs from the polyethylenimine(s). In some embodiments the EVs are released from the polyethylenimine(s) using phosphate buffered saline (PBS), NaCl solution (e.g. 2N NaCl) or a polyanion (e.g. heparin). As above, when the one or more polyethylenimines are conjugated to a solid support, the EVs and one or more polyethylenimines are separated using methods to capture the solid support. For example, when the one or more polyethylenimines are conjugated to a solid support comprising magnetic properties, the one or more polyethylenimines may be separated from the EVs using a magnetic field. As a further example, when the one or more polyethylenimines are conjugated to a solid support comprising a ligand, the one or more polyethylenimines may be separated from the EVs using affinity capture methods.

In some embodiments, the EVs are not released from the one or more polyethylenimines prior to analysis.

In some embodiments, the EVs are released from the one or more polyethylenimines when nanoparticle tracking analysis is to be performed or if the EVs are to be used for transfection experiments or for therapeutic delivery.

In some embodiments, to analyze multiple different types of biomarkers in EVs from a single sample from a subject, the isolated EVs are processed so that multiple types of biomarkers can be analyzed using the same sample. In some embodiments, for example, the isolated EVs are processed with a reagent that allows the isolation of RNA and protein separately from a sample. A non-limiting example of such a reagent is a composition comprising and effective amount of each of phenol, guanidine isothiocyanate and ammonium thiocyanate, commercially available as TRIzol™. In this embodiment, the reagent is added to an aqueous solution of the isolated EVs and the aqueous and organic phases collected separately. The aqueous phase can then be processed for RNA extraction using, for example, a total RNA or miRNA isolation kit, while the organic phase can be used for protein and lipid extraction from the EVs using methods known to those knowledgeable in the art.

In some embodiments, the methods of the application further comprise downstream analyses of the EVs isolated from the sample. In some embodiments, the downstream analyses include, for example, Western blotting, flow cytometry, ELISA, mass spectrometry, PCR, RT-qPCR, and/or RNA-Seq (RNA sequencing).

The present application also includes a kit for the isolation of EVs from biological samples. In some embodiments, the kit is specific for the isolation of EVs from a particular sample type. In some embodiments, the kit is for isolation of EVs from plasma, urine or cell culture media. In some embodiments, the kit comprises, one or more polyethylenimines and optionally, one or more buffers (to be used for diluting the sample or the one or more polyethylenimines, or to be used for washing steps) and a detailed protocol or instructions for use. In some embodiments the one or more polyethylenimines are in the form of a powder, a solution, or coated or conjugated onto a solid support, such as magnetic beads. Depending on the nature of the kit, a positive control, for example, a solution of isolated EVs or an EV-rich conditioned media that can be used as a positive control in downstream analytical techniques, may be included in the kit. In one particular embodiment, a kit for isolation of extracellular vesicles using PEI might include: (1) a solution of branched MW 25000 PEI; (2) 10×PBS buffer; (3) an EV-rich conditioned media from human cultured cells to be used as a positive control; and (4) a detailed protocol. In another particular embodiment, a kit for the isolation of extracellular vesicles using magnetic beads coated with PEI might include: (1) a suspension of PEI-coated magnetic beads; (2) 10×PBS buffer; and (3) a detailed protocol.

In some embodiments, the kit further comprises reagents for releasing the EVs from the polyethylenimine and/or reagents for performing analyses on the EVs isolated from the sample. In some embodiments, the reagents for performing analyses on the EVs are selected from one or more of reagents for PCR, RNA sequencing, proteomics, and/or lipidomics.

Diagnostic Methods

Analysis of EVs that are shed, for example, by cancer cells into the blood stream of the subject, if captured using a simple and robust method, would enable clinical analysis of cancer development and progression and treatment response and monitoring using a non-invasive method, such as regular blood sampling. Furthermore, analysis of EVs that are shed by cancer cells using the methods described herein and comparison to control populations may allow the identification of novel markers of cancer that could be used to develop a simple, non-invasive diagnostic test for cancer or a specific type of cancer. Analysis of cultured cancer cell types, including pancreatic cancer, glioblastoma multiforme, and breast cancer, as well as human plasma, using methods described herein, has demonstrated the capability of polyethylenimine to facilitate the sedimentation, immobilization, or capture of vesicular material from extracellular medium from this material, as determined by the immuno-detection of prototypical extracellular vesicle protein markers, including tetraspanins (e.g. CD63, CD9), heat shock proteins (e.g. HSP70) and lipid raft proteins (e.g. flotillin-1).

The methods described herein for the use of polyethylenimine to capture cancer-derived EVs opens the possibility of utilizing this technology to capture proteins, lipids, and RNA species, for example, that are protected within the EVs, from samples taken from subjects with any pathological condition, and with the potential for downstream analysis using clinically-amenable methods such as Western blotting, flow cytometry, ELISA, mass spectrometry, PCR, RT-qPCR, and RNA-Seq (RNA sequencing), these methods can be used, for example, for diagnosis and treatment monitoring.

Accordingly, the application also includes methods for determining the presence, absence, relapse, remission or progression of one or more pathological conditions comprising:
  (i) isolating EVs from a sample from a subject suspected of having the one or more pathological conditions using a method of the present application;
  (ii) identifying one or more biomarkers for the one or more pathological conditions in the EVs, wherein the presence, absence, or changes in amount of the one or more biological markers in the EVs indicates the presence, absence, relapse, remission, or progression of the one or more pathological conditions in the subject.

In some embodiments, any detectable amount of the one or more biomarkers for the one or more pathological conditions is indicative of the presence, relapse or progression of the one or more pathological conditions, and conversely, no detectable amount of the one or more biomarkers for the one or more pathological conditions is indicative of the absence or remission of the one or more pathological conditions.

In some embodiments the methods of diagnosis further comprises comparing an amount of the one or more biomarkers for the one or more pathological conditions in EVs from a subject with one or more references values. In further embodiments, the comparing is done at multiple time points. In some embodiments, differences in the amount of the one or more biomarkers in the sample from the subject compared to the one or more reference values is indicative of presence, absence, relapse, remission or progression of the one or more pathological conditions in the subject. In some embodiments, when the comparing is done at multiple time points the presence, absence, relapse, remission or progression of the one or more pathological conditions in the subject is determined over time.

In some embodiments, the one or more reference values are amounts of the one or more biomarkers in healthy subjects or subjects known not to have the one or more pathological conditions. In some embodiments, any detectable increase in the amount of the one or more biomarkers compared to the one or more reference values, is indicative of the presence, progression or relapse of the one or more pathological conditions. In some embodiments, any detectable amount of the one or more biomarkers that is the same as or less than the amount of the one or more reference values, is indicative of remission or absence of the one or more pathological conditions.

In some embodiments, the methods of the present application are used to determine the effectiveness of a therapy in the treatment of one or more pathological conditions. Therefore in some embodiments, the application also includes a method to determine the effectiveness of a therapy in the treatment of one or more pathological conditions in a subject diagnosed with having the one or more pathological conditions comprising:
(i) isolating EVs from a sample from the subject using a method of the present application;
(ii) determining an amount of one or more biomarkers for the one or more pathological conditions in the EVs;
(iii) subjecting the subject to the therapy;
(iv) isolating EV's from the subject using a method of the present application one or more times post-therapy and determining an amount of the one or more biomarkers for the one or more pathological conditions at each of the one or more times; and
(v) comparing the amount of the one or more biomarkers obtained post-therapy to the amount of the one or more biomarkers in (ii), wherein a change in the amount of the one or more biomarkers is indicative of the effectiveness of the therapy.

In some embodiments any detectable decrease in the amount of the one or more biomarkers post-therapy compared to the amount of the one or more biomarkers in (ii) indicates that the therapy is effective. In some embodiments, any detectable increase or no change in the amount of the one or more biomarkers post-therapy compared to the amount of the one or more biomarkers in (ii) indicates that the therapy is not effective.

The methods of the present application may also be used to determine the potential of a subject to respond to a particular treatment of one or more pathological conditions, such as cancer, based on the presence or absence of a biomarker known to be correlated to responsiveness to a given targeted therapy. By using the methods of the application, the need for a tissue biopsy from a subject to determine the mutation status of their given pathological condition and eligibility for a particular targeted therapy is avoided. An example of such a therapy may include, but is not limited to, anti-PD1 therapy in patients diagnosed with a cancer having a PD-L1 mutation. Accordingly, the present application also includes a method of predicting a subject's response to one or more therapeutic treatments for one or more pathological conditions comprising:
(i) isolating EVs from a sample from a subject using a method of the present application; and
(ii) determining an amount of one or more biomarkers that is/are predictive of responsiveness to the one or more therapeutic treatments for the one or more pathological conditions in the EVs;
wherein the presence or absence of the one or more biomarkers is indicative of the subject's response to the one or more treatments.

In some embodiments, the presence of the one or more biomarkers in the EVs from the subject is predictive of the subject benefiting from administration of the one or more therapeutic treatments and, conversely, the absence of the one or more biomarkers in the EVs from the subject is predictive of the subject not benefiting from administration of the one or more therapeutic treatments. In some embodiments, the absence of the one or more biomarkers in the EVs from the subject is predictive of the subject benefiting from administration of the one or more therapeutic treatments and, conversely, the presence of the one or more biomarkers in the EVs from the subject is predictive of the subject not benefiting from administration of the one or more therapeutic treatments. In some embodiments, the method of determining a subject's response to one or more therapeutic treatments for the one or more pathological conditions further comprises subsequently determining whether or not to administer the one or more therapeutic treatments to the subject based on the presence or absence of the one or more biomarkers.

The biomarkers are found within, or are associated with, EVs. Examples of biomarkers include, but are not limited to, lipids, metabolites, peptides, proteins, and nucleic acids (e.g. RNA, mRNA, miRNA, LincRNA, misc-RNA, circular-RNA, etc.). In some embodiments the one or more biomarkers is a cancer biomarker. In some embodiments, the cancer biomarker is a gene fusion, for example EML4-ALK.

In addition, the methods of the present application may be used to assess the presence of a pathological condition by monitoring the concentration of EVs in a sample from obtained from a subject. Since certain pathological conditions, including cancer, are associated with higher concentrations of EVs[65,66] an increased concentration of EVs, for instance in plasma, relative to a reference value obtained from samples from healthy control subjects, may be indicative of a pathological condition in the subject. Therefore the present application also includes a method of determining the presence of one or more pathological conditions comprising:
(i) isolating EVs from a sample from a subject suspected of having the one or more pathological conditions using a method of the present application; and
(ii) determining the concentration of the EV's in the sample;
wherein an increase in concentration of EV's in the sample compared to a concentration of EV's in a sample from healthy subjects is indicative of the presence of the one or more pathological conditions in the subject.

In some embodiments, the concentration of EV's in the sample is determined using a method known to those knowledgeable in the art[67].

In some embodiments, the concentration of EV's is determined before and during treatment for the one or more pathological conditions and the concentration is used to monitor the success of the treatment. Therefore, in some embodiments the concentration of EV's in a sample taken from the subject prior to treatment is determined and is compared to the concentration of EVs in samples taken from the subject during and after treatment. Changes in the concentration of EV's before, during and after treatment are indicative of stable disease, progressive disease, or treatment response, depending on whether or not the concentration of EVs during and after treatment remains the same, increases, or decreases, respectively.

Clinically important samples from subjects with a pathological condition are often available only in limited quantities and therefore the ability to analyze multiple different types of biomarkers from a single sample is clinically useful. Therefore, in some embodiments, the methods of the present application are used to analyze multiple different types of biomarkers from a single sample from a subject.

In some embodiments, to analyze multiple different types of biomarkers in EVs from a single sample from a subject, the isolated EVs are processed so that multiple types of biomarkers can be analyzed using the same sample. In some embodiments, for example, the isolated EVs are processed with a reagent that allows the isolation of RNA and protein separately from a sample. A non-limiting example of such a reagent is a composition comprising and effective amount of each of phenol, guanidine isothiocyanate and ammonium thiocyanate, commercially available as TRIzol™. In this embodiment, the reagent is added to an aqueous solution of the isolated EVs and the aqueous and organic phases collected separately. The aqueous phase can then be processed for RNA extraction using, for example, a total RNA or miRNA isolation kit, while the organic phase can be used for protein and lipid extraction from the EVs using methods known to those knowledgeable in the art.

In some embodiments, the EVs are analyzed for one or more markers in the RNA, protein, lipids, etc., extracted from the EVs isolated using methods such as PCR, RNA sequencing, proteomics, and/or lipidomics.

In some embodiments, the biomarkers include, but are not limited to, metabolites, lipids, proteins, peptides, mRNA, miRNA and LincRNA.

In some embodiments, the one or more pathological conditions are selected from cancers.

Therapeutic Methods

There are an increasing number of clinical trials using EVs as drug delivery systems[10]. The development of new EV isolation methods that yield good recovery of functional, therapeutically-active EVs that are amenable to scale-up for processing large volumes would be highly valuable additions to this rapidly expanding field of translational clinical research.

Accordingly, is some embodiments, the methods of the present application are used to isolate EVs for use as therapeutics in the treatment of one or more pathological conditions, such as cancer. Therefore in some embodiments, there is included a method for isolating EVs for therapeutic use comprising:
 (i) isolating EVs from a sample from a subject using a method of the present application;
 (ii) releasing the EVs from the polyethylenimine; and
 (iii) formulating the released EVs in a pharmaceutical composition.

In some embodiments, the released EVs are modified to make them therapeutically active. In some embodiments, the EVs are modified by incorporation therein of one or more therapeutically active substances, for example, small molecule drugs (e.g. doxorubicin, paclitaxel, or curcumin), or nucleic acids (e.g. DNA, siRNA or miRNA), or miRNA mimics or inhibitors[68,69]. In some embodiments, the one or more therapeutically active substances are selected from a drug, peptide, protein, DNA and RNA. The DNA and RNA may be either non-coding or coding. In some embodiments, when the EVs are unmodified the EVs have been isolated from stem cells or umbilical cord blood.

In some embodiments, the EVs are isolated from a sample from a subject suffering from one or more pathological conditions, such as cancer, and the subject is responsive to at least one therapy for treatment of the condition(s). By "responsive" it is meant that the at least one therapy has at least some beneficial or therapeutic effect on the one or more pathological conditions.

In some embodiments, the EVs are isolated from a sample comprising cultured cell lines or stem cells.

In some embodiments, the EVs are isolated from a sample comprising unmodified cells containing native EVs or genetically-modified cells which release EVs containing trans-gene products.

In some embodiments, the sample is from a subject that is not being treated for one or more pathological conditions i.e. a human donor (allogeneic), or from a subject's own biofluids (autologous).

In some embodiments, the sample is from a subject prior to treatment for the one or more pathological conditions.

In some embodiments, the EVs are released from the polyethylenimine using a polyanion. In some embodiments, the polyanion is heparin. In some embodiments, the EVs are released using phosphate buffered saline (PBS), or NaCl solution (e.g. 2N NaCl).

In some embodiments, the released EVs are sterilized prior to formulation in the pharmaceutical composition. In some embodiments, the released EVs are sterilized by passing through a 0.2 µm filter.

In some embodiments, the released EV's are formulated in a composition for administration by intravenous injection, subcutaneous injection, intra-peritoneal injection or intra-nasal administration.

In some embodiments, the incorporation of the one or more therapeutically active substances into the released EVs renders the EVs into an efficient delivery vehicle for the one or more therapeutically active substances to a target cell[68,69]. For example, in some embodiments, tumour-derived EVs from either cultured cells or from an autologous or allogeneic source are isolated using polyethylenimine according to the method of the application. The EVs are then released from the polyethylenimine, loaded with one or more chemotherapeutic drugs, for example by exogenous loading, and then administered to a subject with cancer in order to improve delivery, availability, the functional half-life and/or safety of the drug(s) compared to drug(s) alone (i.e. not incorporated or loaded into EVs).

The following non-limiting examples are illustrative of the present application. As is apparent to those skilled in the art, many of the details of the examples may be changed while still practicing the methods, compositions and kits described herein.

EXAMPLES

Example 1

Figure 2:
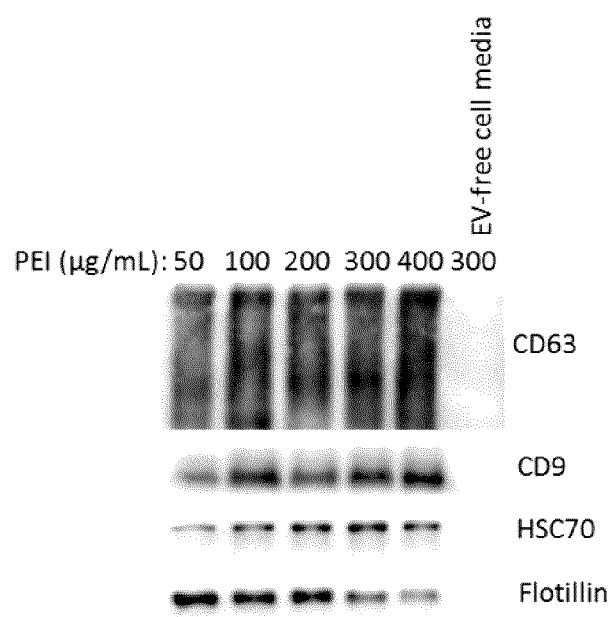
FIG. 2 shows an immunoblot demonstrating the detection of extracellular vesicle protein markers (CD63, CD9, HSC70, and flotillin-1) isolated using an exemplary embodiment of a method of the application, from media collected from BXPC3 pancreatic cancer cells growing in a bioreactor.

Branched MW 25,000 Da polyethylenimine was dissolved in water at 10 mg/mL and filter sterilized with a 0.2 µm filter. Conditioned media was obtained from a bioreactor (CELLine 1000) growing BXPC3 pancreatic cancer cells growing at 37° C. with 5% $CO_2$. The conditioned media was pre-cleared by centrifugation at 800 g for 10 minutes at 4° C. to remove cells and cell debris. The conditioned media was stored at 4° C. with 15 μL/mL of protease inhibitor cocktail Ill (Cedarlane cat #539134-1 mL) and 0.1% Pro-Clin™ 300 biocide (Sigma 48912-U). The conditioned media was then further pre-cleared immediately prior to use by centrifugation at 17,000 g for 15 minutes at 4° C. to remove large apoptotic bodies and smaller cell debris. PEI was then added at 50 to 400 micrograms per mL into 1 mL of pre-cleared conditioned media from BXPC3 bioreactor-grown cells. The conditioned media was incubated with PEI for 1 hour at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 1 mL D-PBS were used to wash the pellet, using a 2 minute 13,000 g centrifugation in between washes. The pellet was resuspended in protein lysis buffer, and a Western blot to detect EV protein markers (e.g. tetraspanins such as CD63 and CD9, HSC70, and flotillin-1) was performed. All concentrations of PEI, from 50 to 400 μg/mL were able to pellet extracellular vesicular material from conditioned media from BXPC3 bioreactor-grown cells as evidenced by the detection of all four EV protein markers (CD63, CD9, HSC70, and Flotillin-1) by Western blotting (FIG. 2).

Example 2

Figure 3:
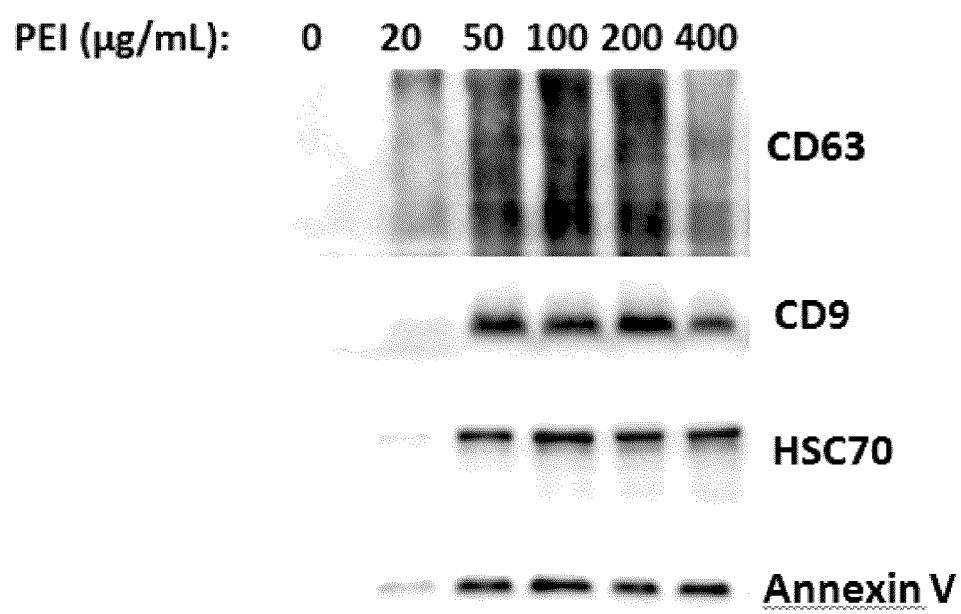
FIG. 3 shows an immunoblot demonstrating the detection of extracellular vesicle protein markers (CD63, CD9, HSC70, and Annexin-V) isolated using an exemplary embodiment of a method of the application from media collected from T98G glioblastoma multiforme cancer cells growing in a bioreactor.

Branched MW 25,000 Da polyethylenimine was dissolved in water at 10 mg/mL and filter sterilized with a 0.2 μm filter. Conditioned media was obtained from a bioreactor (CELLine 1000) growing T98G glioblastoma multiforme cancer cells growing at 37° C. with 5% $CO_2$. The conditioned media was pre-cleared by centrifugation at 800 g for 10 minutes at 4° C. to remove cells and cell debris. The conditioned media was stored at 4° C. with 15 μL/mL of protease inhibitor cocktail Ill (Cedarlane cat #539134-1 mL) and 0.1% Pro-Clin™ 300 biocide (Sigma 48912-U). The conditioned media was then further pre-cleared immediately prior to use by centrifugation at 17,000 g for 15 minutes at 4° C. to remove large apoptotic bodies and smaller cell debris. PEI was then added at 20 to 400 micrograms per mL into 1 mL of pre-cleared conditioned media from T98G bioreactor-grown cells. The conditioned media was incubated with PEI for 1 hour at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 1 mL D-PBS were used to wash the pellet, using a 2 minute 13,000 g centrifugation in between washes. The pellet was resuspended in protein lysis buffer, and a Western blot to detect EV protein markers (e.g. tetraspanins such as CD63 and CD9, HSC70, Flotillin-1, and Annexin V) was performed. All concentrations of PEI, from 20 to 400 μg/mL were able to pellet extracellular vesicular material from conditioned media from T98G bioreactor-grown cells as evidenced by the detection of all four EV protein markers (CD63, CD9, HSC70, and Annexin V) by Western blotting (FIG. 3).

Example 3

Figure 4:
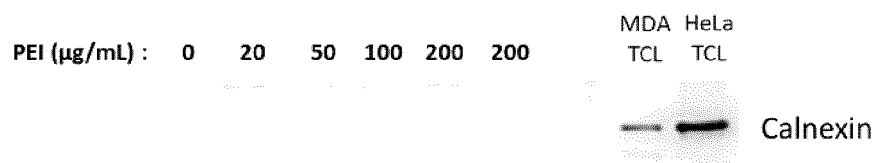
FIG. 4 shows an immunoblot demonstrating that calnexin, an endoplasmic reticulum protein that is not found in EVs, is not detected in EVs isolated using an exemplary embodiment of a method of the application, from media collected from T98G glioblastoma multiforme cancer cells growing in a bioreactor.

Branched MW 25,000 Da polyethylenimine was dissolved in water at 10 mg/mL and filter sterilized with a 0.2 μm filter. Conditioned media was obtained from a bioreactor (CELLine 1000) growing T98G glioblastoma multiforme cancer cells growing at 37° C. with 5% $CO_2$. The conditioned media was pre-cleared by centrifugation at 800 g for 10 minutes at 4° C. to remove cells and cell debris. The conditioned media was stored at 4° C. with 15 μL/mL of protease inhibitor cocktail Ill (Cedarlane cat #539134-1 mL) and 0.1% Pro-Clin™ 300 biocide (Sigma 48912-U). The conditioned media was then further pre-cleared immediately prior to use by centrifugation at 17,000 g for 15 minutes at 4° C. to remove large apoptotic bodies and smaller cell debris. PEI was then added at 20 to 400 micrograms per mL into 1 mL of pre-cleared conditioned media from T98G bioreactor-grown cells. The conditioned media was incubated with PEI for 1 hour at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 1 mL D-PBS were used to wash the pellet, using a 2 minute 13,000 g centrifugation in between washes. The pellet was resuspended in protein lysis buffer, and a Western blot to detect calnexin, an endoplasmic reticulum protein that is not found in EVs, was performed. Calnexin was not observed in the EV/PEI pellet using any concentration of PEI, from 20 μg/mL to 400 μg/mL, as evidenced by Western blotting (FIG. 4). This result suggests that cellular proteins that are not closely associated with, or packaged inside, or on the surface of, EVs are not being precipitated by PEI.

Example 4

Figure 5:
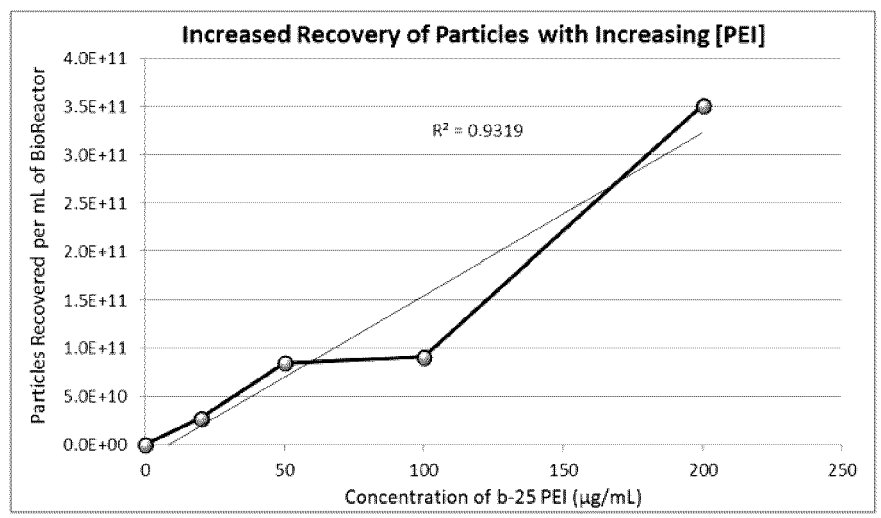
FIG. 5 shows a graph demonstrating that the concentration of particles, as measured by nanoparticle tracking analysis (NTA), is increased by using increasing concentrations of PEI and media collected using an exemplary embodiment of a method of the application from T98G glioblastoma multiforme cancer cells growing in a bioreactor.

Branched MW 25,000 Da polyethylenimine was dissolved in water at 10 mg/mL and filter sterilized with a 0.2 μm filter. Conditioned media was obtained from a bioreactor (CELLine 1000) growing T98G glioblastoma multiforme cancer cells growing at 37° C. with 5% $CO_2$. The conditioned media was pre-cleared by centrifugation at 800 g for 10 minutes at 4° C. to remove cells and cell debris. The conditioned media was stored at 4° C. with 15 μL/mL of protease inhibitor cocktail Ill (Cedarlane cat #539134-1 mL) and 0.1% Pro-Clin™ 300 biocide (Sigma 48912-U). The conditioned media was then further pre-cleared immediately prior to use by centrifugation at 17,000 g for 15 minutes at 4° C. to remove large apoptotic bodies and smaller cell debris. PEI was then added at 20 to 400 micrograms per mL into 1 mL of pre-cleared conditioned media from T98G bioreactor-grown cells. The conditioned media was incubated with PEI for 1 hour at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 1 mL D-PBS were used to wash the pellet, using a 2 minute 13,000 g centrifugation in between washes. The pellets were resuspended in 100 μL of 0.5 mg/mL heparin and incubated overnight at 4° C. The samples were centrifuged at 13,000 g for 2 minutes to remove any large particles, and analyzed by Nanoparticle tracking analysis to determine particle concentration. An increasing number of EV-sized particles (Tables 1 and 2 and FIG. 7) were recovered with increasing concentrations of PEI from T98G bioreactor supernatant (FIG. 5).

Example 5

Figure 6:
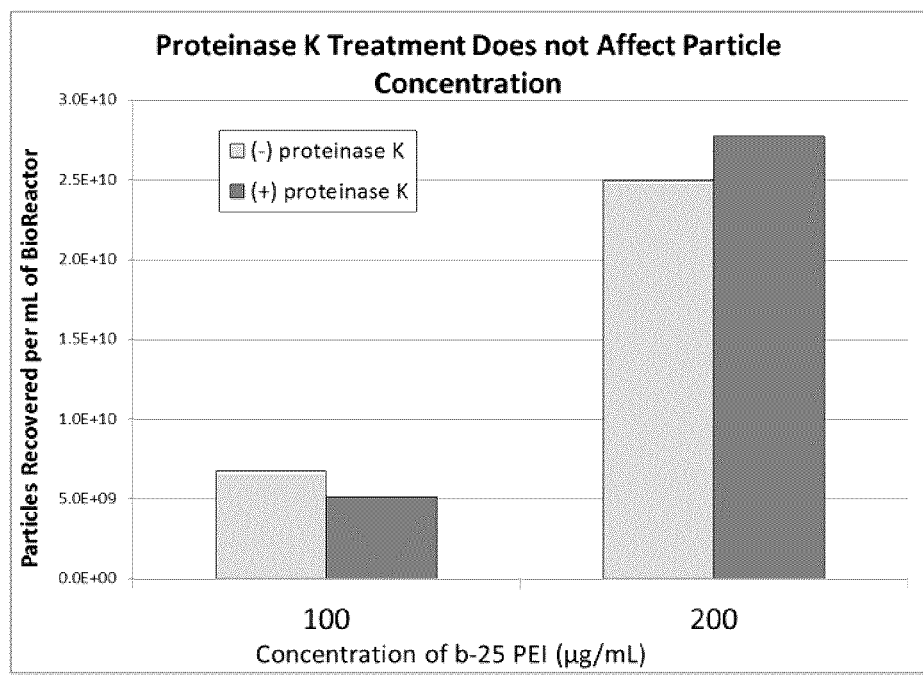
FIG. 6 shows a graph demonstrating that the concentration of particles isolated using an exemplary embodiment of a method of the application, from T98G glioblastoma multiforme cancer cell bioreactor media does not change after proteinase K digestion, suggesting that the particles are EVs and not protein aggregates.

Branched MW 25,000 Da polyethylenimine was dissolved in water at 10 mg/mL and filter sterilized with a 0.2

µm filter. Conditioned media was obtained from a bioreactor (CELLine 1000) growing T98G glioblastoma multiforme cancer cells growing at 37° C. with 5% $CO_2$. The conditioned media was pre-cleared by centrifugation at 800 g for 10 minutes at 4° C. to remove cells and cell debris. The conditioned media was stored at 4° C. with 15 µL/mL of protease inhibitor cocktail Ill (Cedarlane cat #539134-1 mL) and 0.1% Pro-Clin™ 300 biocide (Sigma 48912-U). The conditioned media was then further pre-cleared immediately prior to use by centrifugation at 17,000 g for 15 minutes at 4° C. to remove large apoptotic bodies and smaller cell debris. PEI was then added at either 100 or 200 micrograms per mL into 1 mL of pre-cleared conditioned media from T98G bioreactor-grown cells. The conditioned media was incubated with PEI for 1 hour at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 1 mL D-PBS were used to wash the pellet, using a 2 minute 13,000 g centrifugation in between washes. The pellets were resuspended in 100 µL of 0.5 mg/mL heparin and incubated overnight at 4° C. The samples were centrifuged at 13,000 g for 2 minutes to remove any large particles. The dissociated EVs were then incubated with or without 200 µg/mL of proteinase K at 60° C. for 1 hour in order to remove any particles contributed by protein aggregates. Following proteinase K-digestion, the EVs were analyzed by Nanoparticle tracking analysis to determine particle concentration. Proteinase K-digestion did not alter the concentration of particles recovered by PEI from T98G bioreactor supernatant (FIG. 6), suggesting that the particles recovered by PEI were mainly vesicles and not protein aggregates.

Example 6

Branched MW 25,000 Da polyethylenimine was dissolved in water at 10 mg/mL and filter sterilized with a 0.2 µm filter. Conditioned media was obtained from a bioreactor (CELLine 1000) growing BXPC3 pancreatic cancer cells growing at 37° C. with 5% $CO_2$. The conditioned media was pre-cleared by centrifugation at 800 g for 10 minutes at 4° C. to remove cells and cell debris. The conditioned media was stored at 4° C. with 15 µL/mL of protease inhibitor cocktail Ill (Cedarlane cat #539134-1 mL) and 0.1% Pro-Clin™ 300 biocide (Sigma 48912-U). The conditioned media was then further pre-cleared immediately prior to use by centrifugation at 17,000 g for 15 minutes at 4° C. to remove large apoptotic bodies and smaller cell debris. PEI was then added at 200 micrograms per mL into 1 mL of pre-cleared conditioned media from BXPC3 pancreatic bioreactor-grown cells. The conditioned media was incubated with PEI for 1 hour at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 1 mL D-PBS were used to wash the pellet, using a 2 minute 13,000 g centrifugation in between washes. The pellets were resuspended in either D-PBS, 2N NaCl, or 0.5 mg/mL heparin and incubated for either 15 minutes (while vortexing at low speed) or overnight at 4° C. in 100 µL of 0.5 mg/mL heparin and incubated overnight at 4° C. The samples were centrifuged at 13,000 g for 2 minutes to remove any large particles. The EVs were analyzed by Nanoparticle tracking analysis to determine particle concentration and mean particle size. The particles recovered from BXPC3 pancreatic bioreactor supernatant PEI could be dissociated from PEI using either D-PBS, 2N NaCl, or heparin (PBS<2N NaCl<heparin) and were consistent in size with EVs (Tables 1 and 2 and FIG. 7).

Example 7

Branched MW 25,000 Da polyethylenimine was dissolved in water at 10 mg/mL and filter sterilized with a 0.2 µm filter. Conditioned media was obtained from a bioreactor (CELLine 1000) growing PANC10.05 pancreatic cancer cells growing at 37° C. with 5% $CO_2$. The conditioned media was pre-cleared by centrifugation at 800 g for 10 minutes at 4° C. to remove cells and cell debris. The conditioned media was stored at 4° C. with 15 µL/mL of protease inhibitor cocktail Ill (Cedarlane cat #539134-1 mL) and 0.1% Pro-Clin™ 300 biocide (Sigma 48912-U). The conditioned media was then further pre-cleared immediately prior to use by centrifugation at 17,000 g for 15 minutes at 4° C. to remove large apoptotic bodies and smaller cell debris. ExoQuick™ (System Biosciences) was added to 1 mL of pre-cleared conditioned media from PANC10.05 pancreatic bioreactor-grown cells and EVs were isolated according to the manufacturers' protocol. PEI was added at 100 micrograms per mL into 1 mL of pre-cleared conditioned media from PANC10.05 pancreatic bioreactor-grown cells. The conditioned media was incubated with PEI for 1 hour at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 1 mL D-PBS were used to wash the pellet, using a 2 minute 13,000 g centrifugation in between washes. The pellets were resuspended in either D-PBS (ExoQuick™) or 0.5 mg/mL heparin (PEI) and incubated overnight at 4° C. The EVs were labeled with 5 nM of Qtracker@655 Cell Labeling Kit (Molecular Probes), a cell-penetrating peptide conjugated to a fluorescent Qdot that can label membrane-bound vesicles[70] and analyzed by Nanoparticle tracking analysis to determine particle concentration of both total particles (total scatter using 405 nm laser/no filter) and Qtracker®-655-labeled EVs (405 nm laser/500 nm laser). Higher concentrations of fluorescently-labeled EVs were obtained using PEI than ExoQuick™, although the total number of particles was much higher in the ExoQuick™ sample (FIG. 8). The high concentration of non-fluorescent particles in the ExoQuick™ sample is likely due to the presence of large numbers of lipid vesicles (low-density lipoproteins and chylomicrons), which are of similar size to EVs, that are being co-isolated from plasma by ExoQuick™ and which can be detected by light scatter but that do not label with Qtracker®-655. This data suggests that PEI isolates EVs with a higher purity than ExoQuick™.

Example 8

Branched MW 25,000 Da PEI was dissolved in water at 10 mg/mL and filter sterilized. PEI was then added at 5 to 400 micrograms per mL into 1 mL of synthetic neutrally-charged liposomes diluted in D-PBS (100 nm DOPC/CHOL Liposomes labeled with Fluorescein DHPE). The liposomes were incubated with PEI for 1 hour at room temperature and then centrifuged at 17,000 g for 15 minutes. A pellet was observed in the bottom of the tube. Three washes of 1 mL D-PBS were used to wash the pellet, using a 2 minute 13,000 g centrifugation in between washes. The pellet was resuspended in 0.5 mg/mL heparin to dissociate EVs from the PEI. The mixture was left at 4° C. overnight and then centrifuged at 17,000 g for 10 minutes. The supernatant containing the material dissociated from PEI was then transferred to a black 96-well plate and total fluorescence was measured using a fluorescent plate reader. Fluorescence was observed in the samples indicating that neutrally charged DOPC/CHOL liposomes were precipitated by incubation with PEI (FIG. 9).

Example 9

Branched MW 25,000 Da polyethylenimine was dissolved in water at 10 mg/mL and filter sterilized with a 0.2 µm filter. Conditioned media was obtained NCI-H1975 lung cancer cells or MCF-7 breast cancer cells growing in T-75 plates at 37° C. with 5% $CO_2$. The conditioned media was pre-cleared by centrifugation at 2000 g for 10 minutes at 4° C. to remove cells and cell debris. The conditioned media was stored at 4° C. with 0.1% Pro-Clin™ 300 biocide (Sigma 48912-U). The conditioned media was then further pre-cleared immediately prior to use by centrifugation at 2000 g for 10 minutes at 4° C. to remove large apoptotic bodies and smaller cell debris. PEI was then added at 50, 200, or 400 micrograms per mL into 1 mL of pre-cleared conditioned media from NCI-H1975 or MCF-7 cells. The conditioned media was incubated with PEI for 1 hour at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 1 mL D-PBS were used to wash the pellet, using a 2 minute 13,000 g centrifugation in between washes. The pellet was resuspended in protein lysis buffer, and a Western blot to detect EV protein markers (e.g. tetraspanins such as CD63 and CD9, HSC70, and flotillin-1) was performed. All concentrations of PEI, from 50 to 400 µg/mL were able to pellet extracellular vesicular material from conditioned media from both NCI-H1975 lung cancer and MCF-7 breast cancer cells, as evidenced by the detection of all four EV protein markers (CD63, CD9, HSC70, and Flotillin-1) by Western blotting (FIG. 10).

Example 10

Branched MW 25,000 Da polyethylenimine was dissolved in water at 10 mg/mL and filter sterilized with a 0.2 µm filter. Single donor human plasma was obtained from Innovative Research. For each PEI concentration tested, 1 mL of plasma was diluted with 1 mL of D-PBS containing protease inhibitor cocktail. PEI was then added at 20, 50, 100, 200, or 400 micrograms per mL of undiluted plasma. The plasma was incubated with PEI for 1 hour at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 1 mL D-PBS were used to wash the pellet, using a 2 minute 13,000 g centrifugation in between washes. The pellet was resuspended in protein lysis buffer, and a Western blot to detect EV protein markers (e.g. tetraspanins such as CD63 and CD9, HSC70, and flotillin-1) was performed. All concentrations of PEI, from 20 to 400 µg/mL were able to pellet extracellular vesicular material from conditioned media from human plasma as evidenced by the detection of all four EV protein markers (CD63, CD9, HSC70, and Flotillin-1) by Western blotting (FIG. 11), although a dose-dependent increase in EV marker expression was observed up to 200 µg/mL.

Example 11

Branched MW 25,000 Da polyethylenimine was dissolved in water at 10 mg/mL and filter sterilized with a 0.2 µm filter. Single donor human plasma was obtained from Innovative Research. Plasma was spiked ($1\times10^{10}$ particles/mL of plasma) with EVs isolated by ultacentrifugation (100,000 g) from PANC10.05 conditioned media collected from a bioreactor (CELLine 1000) growing PANC10.05 pancreatic cancer cells growing at 37° C. with 5% $CO_2$. For each PEI concentration tested, 1 mL of spiked plasma was diluted with 1 mL of D-PBS containing protease inhibitor cocktail. PEI was then added at 20 to 400 micrograms per mL of undiluted plasma. The plasma was incubated with PEI for 1 hour at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 1 mL D-PBS were used to wash the pellet, using a 10 minute 17,000 g centrifugation in between washes. After the final wash, all liquid was removed from the tube, the pellet was resuspended in 1 mL of PBS, and any DNA co-precipitated with PEI was isolated using the Qiamp® Circulating Nucleic Acid Kit (Qiagen) using the manufacturer's protocol, with the exception that the lysis/proteinase k digestion step was extended from 30 minutes to 60 minutes at 60° C. to ensure complete lysis of EVs. For comparison, total cfDNA from 1 mL of the same spiked plasma was isolated in parallel using the same DNA isolation method. The amplifiable DNA isolated was then quantified by digital drop PCR using a TaqMan® Copy Number Reference Assay, human, RNase P (ThermoFisher Catalog number: 4403328) (Table 3). Since the spiked EVs from PANC10.05 pancreatic cells are heterozygous for kRAS-G12D, a digital drop TaqMan® PCR assay to simultaneously quantify kRAS-G12D and wild-type kRAS was used to quantify kRAS in the DNA samples isolated using PEI according to the method described. In spite of its known ability to bind DNA, PEI was not able to efficiently recover cfDNA from the plasma samples, since it recovered <10% of the DNA recovered by direct isolation of cfDNA from the sample.

Example 12

Branched MW 25,000 Da polyethylenimine was dissolved in water at 10 mg/mL and filter sterilized with a 0.2 µm filter. Single donor human plasma was obtained from Innovative Research. For each PEI concentration tested, 1 mL of plasma, from 4 different biological donors, was diluted with 1 mL of D-PBS containing protease inhibitor cocktail. PEI was then added at 200 micrograms per mL of undiluted plasma. The plasma was incubated with PEI for 1 hour at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 1 mL D-PBS were used to wash the pellet, using a 2 minute 13,000 g centrifugation in between washes. The liquid was removed and the pellet was resuspended in lysis buffer from the mirVana™ miRNA isolation kit (Life Technologies) and 0.25% SDS and vortexed for 30 seconds. The lysate was then put onto a Norgen Biotek DNA column (Plasma/Serum Cell-free Circulating DNA purification mini kit, Norgen Biotek Corp.) and then centrifuged at 3300 g for 30 seconds to selectively capture DNA. The flow-through from the column, which contains the RNA and protein, was processed using the miRVana™ total RNA kit to isolate RNA. The RNA isolated from each sample was quantified using the Qubit™ microRNA assay kit and a Qubit™ fluorimeter. For comparison, the total cell free RNA (cfRNA) present in each of the same plasma samples was isolated using the miRVana miRNA isolation kit using the same procedure as described above and the cfRNA was quantified using the Qubit™ microRNA assay kit and a Qubit fluorometer (Table 4). PEI was able to recover RNA from the plasma samples, although significantly less than was recovered from total cfRNA isolation. This data suggests that PEI is only able to recover a subset of RNA that is present in the plasma sample, and specifically, a subset of RNA that is contained within EVs. The packaging of miRNAs into EVs is a specific rather than indiscriminate process, and certain specific miRNAs, such as mir-142-3p, have been found to be enriched in EVs[24]. The expression of three specific miRNAs was assessed by converting the miRNA to cDNA using the TaqMan® ADVANCED miRNA cDNA kit (Life Technologies) followed by digital drop PCR using TaqMan® Advanced miRNA assays for miR-99a-5p, miRNA-16-5p, or miRNA-142-3p (Life Technologies). There was no significant difference between the expression of miRNAs that are not specifically associated with EVs, mir-16-5p or mir-99a-5p, in PEI-isolated RNA versus cfRNA. However, mir-142-3p was highly enriched in the RNA isolated using PEI (FIG. 12). Packaging of miR-142-3p into EVs secreted from oral cancer cells has been demonstrated to promote cancer progression by eliminating the tumor suppressive effect of this miRNA and EV-associated miR-142-3p can also affect the tumor microenvironment by promoting angiogenesis by its actions on TGFBR1, a direct target of miR-142-3p[68]. This data demonstrates that PEI preferentially isolates the subset of RNA that is present in the plasma sample that is contained within EVs, and not RNA that exist outside of cells and EVs, suggesting that the isolation of nucleic acids by PEI is dependent on its ability to isolate EVs, rather than non-specific interaction with nucleic acids encountered in plasma.

Example 13

PEI-coated magnetic beads (PEI-M; 25 mg/mL; Micromod Partikeltechnologie GmbH) or branched 25,000 MW (Da) polyethylenimine were incubated with conditioned media obtained from a bioreactor (CELLine 1000) growing PANC10.05 pancreatic cancer cells growing at 37° C. with 5% $CO_2$. The conditioned media was incubated with branched 25,000 Da PEI or increasing volumes of PEI-coated magnetic beads for 2 hours at room temperature with end-over-end rotation. Dynabeads® conjugated to streptavidin (Dynabeads® MyOne Streptavidin C1) were used as a control for any EVs that may bind directly to magnetic beads. The PEI magnetic beads were recovered by incubation for 2 minutes on a magnet and washed three times with PBS using magnetic capture between washes. The magnetic beads were resuspended in protein lysis buffer, boiled, and protein lysate was separated from the magnetic beads using a magnet. The branched PEI-EV pellet was sedimented following incubation of branched PEI in the conditioned media by centrifugation at 17,000 g for 15 minutes. A pellet was observed in the bottom of the tube and the supernatant containing the non-sedimented sample was removed from the pellet. Three washes of 1 mL D-PBS were used to wash the pellet, using a 2 minute 13,000 g centrifugation in between washes. The pellet was resuspended in a protein lysis buffer and a Western blot (FIG. 13A) to detect EV protein markers (e.g. tetraspanins such as CD63 and CD9, HSC70, Flotillin-1, and Annexin V) was performed. Alternatively, the PEI-EV pellets were dissociated in 0.5 mg/mL heparin and analyzed by nanoparticle tracking analysis to determine particle concentration and size distribution (FIG. 13B). Increasing volumes of PEI magnetic beads were able to recover increasing amounts of extracellular vesicular material from conditioned media from PANC10.05 bioreactor-grown cells as evidenced by the detection of all four EV protein markers (CD63, CD9, HSC70, and Annexin V) by Western blotting (FIG. 13A) and as evidenced by the recovery of a higher concentration of EV-sized particles using increasing amounts of PEI magnetic beads (FIG. 13B). These data demonstrate that PEI-coated magnetic beads, but not magnetic beads without PEI, are able to capture EVs from conditioned cell media.

Example 14

Branched polyethylenimines ranging in size from MW 600 Da to MW 750,000 Da were dissolved in water at 10 mg/mL and filter sterilized with a 0.2 μm filter. Conditioned media was obtained from a bioreactor (CELLine 1000) growing Panc10.05 pancreatic cancer cells growing at 37° C. with 5% $CO_2$. The conditioned media was pre-cleared by centrifugation at 800 g for 10 minutes at 4° C. to remove cells and cell debris. The conditioned media was stored at 4° C. with 15 μL/mL of protease inhibitor cocktail Ill (Cedarlane cat #539134-1 mL) and 0.1% Pro-Clin™ 300 biocide (Sigma 48912-U). The conditioned media was then further pre-cleared immediately prior to use by centrifugation at 17,000 g for 10 minutes at 4° C. to remove large apoptotic bodies and smaller cell debris and then diluted 1:1 in Dulbecco's PBS. Branched polyethylenimines ranging in size from MW 600 Da to MW 750,000 Da were then added at a final concentration of 200 micrograms per mL into 1 mL of pre-cleared conditioned media from Panc10.05 bioreactor-grown cells. An equivalent volume of water was added to 1 mL of media as a vehicle control. The conditioned media was incubated with PEI for 2 hours at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 1 mL D-PBS were used to wash the pellet, using a 2 minute 13,000 g centrifugation in between washes. The pellet was resuspended in protein lysis buffer, and a Western blot to detect EV protein markers (e.g. tetraspanins such as CD63 and CD9, HSC70, and Flotillin-1) was performed. The endoplasmic reticulum protein Calnexin was included as a negative control since it is not localized in EVs.

All MW of branched PEI, from 600 Da to 750,000 Da were able to pellet extracellular vesicular material from conditioned media from Panc10.05 bioreactor-grown cells as evidenced by the detection of all four EV protein markers (CD63, CD9, HSC70, and Flotillin-1) by Western blotting (FIG. 14). However, PEI with MW of 1200 Da or less were less efficient at precipitating EVs than PEI with MW of 10,000 Da or greater. Branched PEI with MW of either 10,000 Da, 25,000 Da, 70,000 Da, or 750,000 Da had equivalent efficiency at precipitating EV markers by Western blotting.

Example 15

Linear polyethylenimines ranging in size from MW 2500 Da to MW 160,000 Da were dissolved in water at 1 mg/mL and filter sterilized with a 0.2 μm filter. Branched PEI with MW of either 10,000 or 25,000 Da were dissolved in water at 10 mg/mL and filter sterilized with a 0.2 μm filter. Conditioned media was obtained from a bioreactor (CEL-Line 1000) growing Panc10.05 pancreatic cancer cells growing at 37° C. with 5% $CO_2$. The conditioned media was pre-cleared by centrifugation at 800 g for 10 minutes at 4° C. to remove cells and cell debris. The conditioned media was stored at 4° C. with 15 μL/mL of protease inhibitor cocktail Ill (Cedarlane cat #539134-1 mL) and 0.1% Pro-Clin™ 300 biocide (Sigma 48912-U). The conditioned media was then further pre-cleared immediately prior to use by centrifugation at 17,000 g for 10 minutes at 4° C. to remove large apoptotic bodies and smaller cell debris and then diluted 1:1 in Dulbecco's PBS. Linear or branched polyethylenimines ranging in size from MW 2500 Da to MW 160,000 Da were then added at a final concentration of 200 micrograms per mL into 1 mL of pre-cleared conditioned media from Panc10.05 bioreactor-grown cells. An equivalent volume of water was added to 1 mL of media as a vehicle control. The conditioned media was incubated with PEI for 2 hours at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 1 mL D-PBS were used to wash the pellet, using a 2 minute 13,000 g centrifugation in between washes. The pellet was resuspended in protein lysis buffer, and a Western blot to detect EV protein markers (e.g. tetraspanins such as CD63 and CD9, HSC70, and Flotillin-1) was performed. The endoplasmic reticulum protein Calnexin was included as a negative control since it is not localized in EVs.

All MW of both linear and branched PEI, from 2500 Da to 160,000 Da were able to pellet extracellular vesicular material from conditioned media from Panc10.05 bioreactor-grown cells as evidenced by the detection of all four EV protein markers (CD63, CD9, HSC70, and Flotillin-1) by Western blotting (FIG. 15). However, a trend of increasing EV protein marker recovery was observed with increased MW of linear PEI, with the best EV recovery occurring with linear PEI with MW of 160,000 Da. Branched PEI with MW of 10,000 Da or 25,000 Da was more efficient at precipitating EVs than linear PEI with MW of 160,000 Da as evidenced by EV markers following Western blotting.

Example 16

Branched polyethylenimines ranging in size from MW 600 Da to MW 750,000 Da were dissolved in water at 10 mg/mL and filter sterilized with a 0.2 μm filter. Human plasma processed from blood collected in EDTA blood collection tubes was obtained from Cedarlane (Cedarlane cat #IPLA-N-S-10ML-K2EDTA). The plasma was spiked with 5 μL/mL of protease inhibitor cocktail Ill (Cedarlane cat #539134-1 mL) and then diluted 1:1 in Dulbecco's PBS. Branched polyethylenimines ranging in size from MW 600 Da to MW 750,000 Da were then added to two mL of diluted plasma at a final concentration of 200 micrograms per mL of undiluted plasma volume. An equivalent volume of water was added to 2 mL of diluted plasma as a vehicle control. The plasma was incubated with PEI for 1 hour at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 2 mL D-PBS were used to wash the pellet, using a 2 minute 13,000 g centrifugation in between washes. The pellet was resuspended in protein lysis buffer, and a Western blot to detect EV protein markers (e.g. tetraspanins such as CD63 and CD9, HSC70, and Flotillin-1) was performed. The endoplasmic reticulum protein Calnexin was included as a negative control since it is not localized in EVs.

All MW of branched PEI, from 600 Da to 750,000 Da were able to pellet extracellular vesicular material from human plasma as evidenced by the detection of all four EV protein markers (CD63, CD9, HSC70, and Flotillin-1) by Western blotting (FIG. 16). However, PEI with MW of 1200 Da or less were much less efficient at precipitating EVs than PEI with MW of 10,000 Da or greater. Branched PEI with MW of either 10,000 Da or 25,000 Da, were more efficient at precipitating EV markers than branched PEI with MW of 70,000 Da or 750,000 Da as evidenced by Western blotting. Therefore, branched PEI with MW of either 10,000 Da or 25,000 Da were most efficient at precipitating EVs as determined by Western blot analysis.

Example 17

Linear polyethylenimines with MW ranging from 2500 Da to MW 160,000 Da were dissolved in water at 1 mg/mL and filter sterilized with a 0.2 μm filter. Branched PEIs with MW of either 10,000 or 25,000 Da were dissolved in water at 10 mg/mL and filter sterilized with a 0.2 μm filter. Human plasma processed from blood collected in EDTA blood collection tubes was obtained from Cedarlane (Cedarlane cat #IPLA-N-S-10ML-K2EDTA). The plasma was spiked with 5 μL/mL of protease inhibitor cocktail Ill (Cedarlane cat #539134-1 mL) and then diluted 1:1 in Dulbecco's PBS. Linear and branched polyethylenimines were then added to 2 mL of diluted plasma at a final concentration of 200 micrograms per mL of undiluted plasma volume. An equivalent volume of water was added to 2 mL of diluted plasma as a vehicle control. The plasma was incubated with PEI for 1 hour at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 2 mL D-PBS were used to wash the pellet, using a 2 minute 13,000 g centrifugation in between washes. The pellet was resuspended in protein lysis buffer, and a Western blot to detect EV protein markers (e.g. tetraspanins such as CD63 and CD9, HSC70, and Flotillin-1) was performed. The endoplasmic reticulum protein Calnexin was included as a negative control since it is not localized in EVs.

All MW of linear PEI, from 2500 Da to 160,000 Da were able to pellet extracellular vesicular material from human plasma as evidenced by the detection of all four EV protein markers (CD63, CD9, HSC70, and Flotillin-1) by Western blotting (FIG. 17). However, a trend of increasing EV protein marker recovery was observed with increased MW of linear PEI, with the best EV recovery occurring with linear PEI with MW of 160,000 Da. Branched PEI with MW of 10,000 Da or 25,000 Da was more efficient at precipitating EVs than linear PEI with MW of 160,000 Da as evidenced by EV markers following Western blotting.

Example 18

Linear polyethylenimines of MW 25,000 Da and MW 160,000 Da were dissolved in water at 1 mg/mL and filter sterilized with a 0.2 µm filter. Branched PEIs with MW of either 10,000 or 25,000 Da were dissolved in water at 10 mg/mL and filter sterilized with a 0.2 µm filter. Human plasma processed from blood collected in EDTA blood collection tubes was obtained from Cedarlane (Cedarlane cat #IPLA-N-S-10ML-K2EDTA). The plasma was spiked with 5 µL/mL of protease inhibitor cocktail Ill (Cedarlane cat #539134-1 mL) and then diluted 1:1 in Dulbecco's PBS. Linear and branched polyethylenimines were then added to one mL of diluted plasma at a final concentration of 200 micrograms per mL of undiluted plasma volume. An equivalent volume of water was added to 1 mL of diluted plasma as a vehicle control. The plasma was incubated with PEI for 1 hour at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 1 mL D-PBS were used to wash the pellet, using a 2 minute 13,000 g centrifugation in between washes. The pellet was resuspended in 100 µL of 0.5 mg/mL heparin, vortexed, incubated overnight at 4° C. and then centrifuged at 17,000 g for 15 minutes and then the EVs dissociated from the PEI was transferred to a new microfuge tube and stored at 4° C. EV isolation using PEI was compared to other well-described EV isolation methods including ultracentrifugation (UCF) and isolation using size exclusion chromatography (Izon). EVs were precipitated from 1 mL of diluted plasma by ultracentrifugation at 100,000 g for 90 minutes followed by a PBS wash and ultracentrifugation at 100,000 g for 70 minutes. The resulting EV pellet was then resuspended in 100 µL of PBS and stored at 4° C. EVs were isolated from 1 mL of diluted plasma using a size exclusion column according to the manufacturer's directions (qEV column, Izon). An equivalent volume of isolated EVs from each isolation method was incubated for 60 minutes with antibodies against CD63 (labeled with PE-Cy7 fluorophore) and CD81 (labeled with APC fluorophore) and EVs labeled with either CD63 or CD81 were quantified (FIG. 18).

Both linear PEIs with MW of 25,000 Da and 160,000 and branched PEIs with MW of 10,000 Da and 25,000 Da recovered CD63+ and CD81+ EVs from plasma with equal or superior efficiency to standard EV isolation methods of UCF and size-exclusion chromatography. CD63 and CD81 are canonical EV proteins, thereby indicating that both branched and linear PEIs can isolate CD63+ and CD81+ EVs from plasma with greater ease and efficiency than other common EV isolation methods.

Example 19

Linear polyethylenimines ranging in size from MW 2500 Da to MW 160,000 Da were dissolved in water at 1 mg/mL and filter sterilized with a 0.2 µm filter. Branched PEI with MW of either 10,000 or 25,000 Da were dissolved in water at 10 mg/mL and filter sterilized with a 0.2 µm filter. Conditioned media was obtained from a bioreactor (CEL-Line 1000) growing Panc10.05 pancreatic cancer cells growing at 37° C. with 5% $CO_2$. The conditioned media was pre-cleared by centrifugation at 800 g for 10 minutes at 4° C. to remove cells and cell debris. The conditioned media was stored at 4° C. with 15 µL/mL of protease inhibitor cocktail Ill (Cedarlane cat #539134-1 mL) and 0.1% Pro-Clin™ 300 biocide (Sigma 48912-U). The conditioned media was then further pre-cleared immediately prior to use by centrifugation at 17,000 g for 10 minutes at 4° C. to remove large apoptotic bodies and smaller cell debris and then diluted 1:1 in Dulbecco's PBS. Linear or branched polyethylenimines ranging in size from MW 2500 Da to MW 160,000 Da were then added at a final concentration of 200 micrograms per mL into 1 mL of pre-cleared conditioned media from Panc10.05 bioreactor-grown cells. Alternatively, 20 µL of PEI-coated magnetic beads (PEI-Mag; 25 mg/mL; Micromod Partikeltechnologie g) or control beads were added to 1 mL of diluted media. An equivalent volume of water was added to 1 mL of media as a vehicle control. The conditioned media was incubated with PEI, magnetic beads, or vehicle control for 2 hours at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 1 mL D-PBS were used to wash the pellet, using a 2 minute 13,000 g centrifugation in between washes. The pellet was resuspended in 50 µL of protein lysis buffer. EV isolation using PEI was compared to other well-described EV isolation methods including Exoquick and UCF. EVs were isolated using Exoquick-TC from 1 mL of diluted media according to the manufacturer's instruction and the resulting EV pellet was resuspended in 50 µL of protein lysis buffer. EVs were precipitated from 1 mL of diluted media by ultracentrifugation at 100,000 g for 90 minutes followed by a PBS wash and ultracentrifugation at 100,000 g for 70 minutes and the resulting EV pellet was resuspended in 50 µL of protein lysis buffer. Western blotting to detect EV protein markers (e.g. tetraspanins such as CD63 and CD9, and HSC70) was performed.

All MW of both linear and branched PEI were able to pellet extracellular vesicular material from conditioned media as evidenced by the detection of all four EV protein markers (CD63, CD9, HSC70, and Flotillin-1) by Western blotting (FIG. 19), however branched PEI was more efficient than linear PEI, and was similar to the results obtained for UCF. As expected, Exoquick recovered much higher levels of EV markers than other methods, but Exoquick EV preparations are known to suffer from low EV purity due to co-precipitation of non-specific proteins (see Example 7 and Example 20).

Example 20

Linear polyethylenimines with MW 25,000 Da and MW 160,000 Da were dissolved in water at 1 mg/mL and filter sterilized with a 0.2 µm filter. Branched PEI with MW of either 10,000 or 25,000 Da were dissolved in water at 10 mg/mL and filter sterilized with a 0.2 µm filter Human plasma processed from blood collected in EDTA blood collection tubes was obtained from Cedarlane (Cedarlane cat #IPLA-N-S-10ML-K2EDTA). The plasma was spiked with 5 µL/mL of protease inhibitor cocktail Ill (Cedarlane cat #539134-1 mL) and then diluted 1:1 in Dulbecco's PBS. Linear or branched polyethylenimines were then added at a final concentration of 200 micrograms per mL of undiluted plasma into 1 mL of diluted PBS. An equivalent volume of water was added to 1 mL of diluted plasma as a vehicle control. The plasma was incubated with PEI for 1 hour at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 1 mL D-PBS were used to wash the pellet, using a 2 minute 13,000 g centrifugation in between washes. The pellet was resuspended in 50 µL of protein lysis buffer. EV isolation using PEI was compared to other well-described EV isolation methods including Exoquick and UCF. EVs were isolated using Exoquick Plasma Prep and exosome isolation kit from 1 mL of diluted media according to the manufacturer's instruction and the resulting EV pellet was resuspended in 50 µL of protein lysis buffer. EVs were precipitated from 1 mL of diluted plasma by ultracentrifugation at 100,000 g for 90 minutes followed by a PBS wash and ultracentrifugation at 100,000 g for 70 minutes and the resulting EV pellet was resuspended in 50 µL of protein lysis buffer. Western blotting to detect EV protein markers (e.g. tetraspanins such as CD63 and CD9, Flotillin-1, and HSC70) was performed.

Linear PEI with MW 160,000 and branched PEI MW 25,000 were able to pellet extracellular vesicular material from plasma as evidenced by the detection of all four EV protein markers (CD63, CD9, HSC70, and Flotillin-1) by Western blotting (FIG. 20), however branched PEI was more efficient than linear PEI, and UCF. As expected, Exoquick recovered much higher levels of Flotillin-1 than other methods but comparatively very little CD63 and CD9. This unequal recovery of EV proteins is indicative of non-specific protein contamination due to the nature of Exoquick's precipitation mechanism of water-exclusion as can be observed in the staining of total protein on the gel (FIG. 20).

Example 21

Branched MW 25,000 Da PEI was dissolved in water at 10 mg/mL and filter sterilized. Human plasma processed from blood collected in EDTA blood collection tubes was obtained from Cedarlane (Cedarlane cat #IPLA-N-S-10ML-K2EDTA). The plasma was spiked with 5 µL/mL of protease inhibitor cocktail Ill (Cedarlane cat #539134-1 mL) and then diluted 1:1 in Dulbecco's PBS. Branched polyethylenimine MW 25,000 Da was then added to diluted plasma at a final concentration of 200 micrograms per mL of undiluted plasma volume. An equivalent volume of plasma was processed for mass spectrometry directly without first isolating EVs. The plasma was incubated with PEI for 1 hour at room temperature with end-over-end rotation. The EV-PEI pellet was sedimented by centrifugation at 17,000 g for 15 minutes. A pellet was observed in the bottom of the tube and the supernatant containing the non-sedimented sample was removed from the pellet. Three washes of 2 mL D-PBS were used to wash the pellet, using a 2 minute 13,000 g centrifugation in between washes. Protein was isolated from the EV pellet and processed for mass spectrometry. Protein (25 µg) samples were processed on 4-12% pre-cast electrophoresis gels, fixed with 50% methanol containing 5% acetic acid for 1 hour, stained with EZ-blue staining reagent and de-stained overnight in water. Each gel lane was excised into twelve equal sized bands. All bands were processed for Mass Spectrometry (nano LC-ms/ms) by tryptic digestion. Extracellular Exosome Gene ontology (GO:0070062) of Plasma and PEI-EV protein enrichment is shown in FIG. 21. Proteins isolated from plasma were compared to matching PEI-EV proteins by Mass Spectrometry. Identified proteins were analyzed by gene ontology enrichment analysis for cellular component. The number of proteins classified to be of extracellular exosome origin is demonstrated for both PEI-isolated EVs and for plasma. PEI enriched extracellular exosome proteins by double (424/2097 vs 225/2097) compared to plasma, demonstrating the utility of using PEI to enrich EV proteins from plasma and to characterize circulating EVs by mass spectrometry.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

TABLE 1

| | Dissociation Time (Particles/mL) | | |
|---|---|---|---|
| | Dissociation Buffer | 15 min | 24 hours |
| PEI 200 µg/mL | PBS | 2.18E+09 | 5.37E+09 |
| | 2N NaCl | 1.57E+10 | 2.62E+10 |
| | 0.5 mg/mL Heparin | 3.19E+10 | 4.03E+10 |

TABLE 2

| | Dissociation Time (Mean Particle Size, nm) | | |
|---|---|---|---|
| | Dissociation Buffer | 15 min | 24 hours |
| PEI 200 µg/mL | PBS | 132 | 139 |
| | 2N NaCl | 292 | 140 |
| | 0.5 mg/mL Heparin | 123 | 118 |

TABLE 3

| Concentration of PEI (µg/mL) | ng of DNA per mL of plasma (RNASE P) | wt kRAS (copies/mL plasma) | KRAS G12D (copies/mL plasma) |
|---|---|---|---|
| 0 | 0.5 | 18 | 11 |
| 20 | 1.4 | 34 | 17 |
| 50 | 1.8 | 22 | 20 |
| 100 | 0.8 | 7 | 5 |
| 200 | 0.6 | 2 | 2 |
| 400 | 0.7 | 3 | 5 |
| cfDNA | 15.5 | 198 | 168 |

TABLE 4

| Test Article (biological plasma replicate) | RNA ng/mL plasma; Qubit) | Mean RNA (ng/mL plasma) | p value |
|---|---|---|---|
| PEI (n = 1) | 23.3 | 22.3 | 0.041 |
| PEI (n = 2) | 17.0 | | |
| PEI (n = 3) | 28.4 | | |
| PEI (n = 4) | 20.4 | | |
| cfRNA (n = 1) | 30.8 | 33.8 | |
| cfRNA (n = 2) | 30.2 | | |
| cfRNA (n = 3) | 29.2 | | |
| cfRNA (n = 4) | 44.9 | | |

FULL CITATIONS FOR DOCUMENTS REFERRED TO IN THE SPECIFICATION

1. Mittelbrunn & Sanchez-Madrid. Intercellular communication: diverse structures for exchange of genetic information. Nature Reviews 2012; 13:328-335

2. Soo C Y, Song Y, Zheng Y, Campbell E C, Riches A C, Gunn-Moore F, Powis S J. Nanoparticle tracking analysis monitors microvesicle and exosome secretion from immune cells. Immunology. 2012 June; 136(2):192-7. doi: 10.1111/j.1365-2567.2012.03569.x.
3. Momen-Heravi F, Saha B, Kodys K, Catalano D, Satishchandran A, Szabo G. Increased number of circulating exosomes and their microRNA cargos are potential novel biomarkers in alcoholic hepatitis. J Transl Med. 2015 Aug. 12; 13:261. doi: 10.1186/s12967-015-0623-9.
4. Brinton L T, Sloane H S, Kester M, Kelly K A. Formation and role of exosomes in cancer. Cell Mol Life Sci. 2015 February; 72(4):659-71. doi: 10.1007/s00018-014-1764-3. Epub 2014 October 22. Review.
5. Yu X, Harris S L, Levine A J. The regulation of exosome secretion: a novel function of the p53 protein. Cancer Res. 2006 May 1; 66(9):4795-801.
6. Brock G, Castellanos-Rizaldos E, Hu L, Coticchia C, Skog J. Liquid biopsy for cancer screening, patient stratification and monitoring. Transl Cancer Res. 2015; 4(3): 280-290.
7. Yang M, Forbes M E, Bitting R L, O'Neill S S, Chou P C, Topaloglu U, Miller L D, Hawkins G A, Grant S C, DeYoung B R, Petty W J, Chen K, Pasche B C, Zhang W. Incorporating blood-based liquid biopsy information into cancer staging: time for a TNMB system?Ann Oncol. 2018 Feb. 1; 29(2):311-323. doi: 10.1093/annonc/mdx766.
8. Yoon Y J, Kim O Y, Gho Y S. Extracellular vesicles as emerging intercellular communicasomes. BMB Rep. 2014 October; 47(10):531-9. Review.
9. EL Andaloussi S, Mäger I, Breakefield X O, Wood M J. Extracellular vesicles: biology and emerging therapeutic opportunities. Nat Rev Drug Discov. 2013 May; 12(5): 347-57. doi: 10.1038/nrd3978. Epub 2013 April 15. Review.
10. Lener T, Gimona M, Aigner L, Börger V, Buzas E, Camussi G, Chaput N, Chatterjee D, Court F A, Del Portillo H A, O'Driscoll L, Fais S, Falcon-Perez J M, Felderhoff-Mueser U, Fraile L, Gho Y S, Gorgens A, Gupta R C, Hendrix A, Hermann D M, Hill A F, Hochberg F, Horn P A, de Kleijn D, Kordelas L, Kramer B W, Krämer-Albers E M, Laner-Plamberger S, Laitinen S, Leonardi T, Lorenowicz M J, Lim S K, Lötvall J, Maguire C A, Marcilla A, Nazarenko I, Ochiya T, Patel T, Pedersen S, Pocsfalvi G, Pluchino S, Quesenberry P, Reischl I G, Rivera F J, Sanzenbacher R, Schallmoser K, Slaper-Cortenbach I, Strunk D, Tonn T, Vader P, van Balkom B W, Wauben M, Andaloussi S E, Théry C, Rohde E, Giebel B. Applying extracellular vesicles based therapeutics in clinical trials—an ISEV position paper. J Extracell Vesicles. 2015 Dec. 31; 4:30087. doi: 10.3402/jev.v4.30087
11. Kawamura Y, Yamamoto Y, Sato T A, Ochiya T. Extracellular vesicles as trans-genomic agents: Emerging roles in disease and evolution. Cancer Sci. 2017 May; 108(5): 824-830. doi: 10.1111/cas.13222. Epub 2017 May 18. Review.
12. Abels E R, Breakefield X O. Introduction to Extracellular Vesicles: Biogenesis, RNA Cargo Selection, Content, Release, and Uptake. Cell Mol Neurobiol. 2016 April; 36(3):301-12. doi: 10.1007/s10571-016-0366-z. Epub 2016 April 6. Review.
13. Cheng L, Sun X, Scicluna B J, et al. Characterization and deep sequencing analysis of exosomal and non-exosomal miRNA in human urine. Kidney Int. 2014 August; 86(2): 433-44; doi: 10.1038/ki.2013.502
14. Huang X, Yuan T, Tschannen M, Sun Z, Jacob H, Du M, Liang M, Dittmar R L, Liu Y, Liang M, Kohli M, Thibodeau S N, Boardman L, Wang L. Characterization of human plasma-derived exosomal RNAs by deep sequencing. BMC Genomics. 2013 May 10; 14:319.
15. Ogawa Y, Taketomi Y, Murakami M, Tsujimoto M, Yanoshita R. Small RNA transcriptomes of two types of exosomes in human whole saliva determined by next generation sequencing. Biol Pharm Bull. 2013; 36(1):66-75.
16. AI-Nedawi K, Meehan B, Micallef J, Lhotak V, May L, Guha A, Rak J. Intercellular transfer of the oncogenic receptor EGFRvIII by microvesicles derived from tumour cells. Nat Cell Biol 2008; 10:619-24; PMID:18425114; http://dx.doi.org/10.1038/ncb1725.
17. Zomer A, Maynard C, Verweij F J, Kamermans A, Schafer R, Beerling E, Schiffelers R M, de Wit E, Berenguer J, Ellenbroek S I, et al. In Vivo imaging reveals extracellular vesicle-mediated phenocopying of metastatic behavior. Cell 2015; 161:1046-57; PMID: 26000481; http://dx. doi.org/10.1016/j.cell.2015.04.042)
18. Conley A, Minciacchi V R, Lee D H, Knudsen B S, Karlan B Y, Citrigno L, Viglietto G, Tewari M, Freeman M R, Demichelis F, Di Vizio D. High-throughput sequencing of two populations of extracellular vesicles provides an mRNA signature that can be detected in the circulation of breast cancer patients. RNA Biol. 2017 Mar. 4; 14(3):305-316. doi: 10.1080/15476286.2016.1259061.
19. Li P, Kaslan M, Lee S H, Yao J, Gao Z. Progress in Exosome Isolation Techniques. Theranostics. 2017 Jan. 26; 7(3):789-804. doi: 10.7150/thno.18133.
20. Escudier B, Dorval T, Chaput N, André F, Caby M P, Novault S, Flament C, Leboulaire C, Borg C, Amigorena S, Boccaccio C, Bonnerot C, Dhellin O, Movassagh M, Piperno S, Robert C, Serra V, Valente N, Le Pecq J B, Spatz A, Lantz O, Tursz T, Angevin E, Zitvogel L. Vaccination of metastatic melanoma patients with autologous dendritic cell (DC) derived-exosomes: results of the first phase I clinical trial. J Transl Med. 2005 Mar. 2; 3(1):10.
21. Stranska R, Gysbrechts L, Wouters J, Vermeersch P, Bloch K, Dierickx D, Andrei G, Snoeck R. Comparison of membrane affinity-based method with size-exclusion chromatography for isolation of exosome-like vesicles from human plasma. J Transl Med. 2018 Jan. 9; 16(1):1. doi: 10.1186/s12967-017-1374-6.
22. Tang Y T, Huang Y Y, Zheng L, Qin S H, Xu X P, An T X, Xu Y, Wu Y S, Hu X M, Ping B H, Wang Q. Comparison of isolation methods of exosomes and exosomal RNA from cell culture medium and serum. Int J Mol Med. 2017 September; 40(3):834-844. doi: 10.3892/ijmm.2017.3080. Epub 2017 July 24.
23. Van Deun J, Mestdagh P, Sormunen R, Cocquyt V, Vermaelen K, Vandesompele J, Bracke M, De Wever O, Hendrix A. The impact of disparate isolation methods for extracellular vesicles on downstream RNA profiling. J Extracell Vesicles. 2014 Sep. 18; 3. doi: 10.3402/jev.v3.24858.
24. Arroyo J D, Chevillet J R, Kroh E M, Ruf I K, Pritchard C C, Gibson D F, Mitchell P S, Bennett C F, Pogosova-Agadjanyan E L, Stirewalt D L, Tait J F, Tewari M. Argonaute2 complexes carry a population of circulating microRNAs independent of vesicles in human plasma. Proc Natl Acad Sci USA. 2011 Mar. 22; 108(12):5003-8. doi: 10.1073/pnas.1019055108.
25. Turchinovich A, Weiz L, Langheinz A, Burwinkel B. Characterization of extracellular circulating microRNA.

Nucleic Acids Res. 2011 Sep. 1; 39(16):7223-33. doi: 10.1093/nar/gkr254Wagner J, Riwanto M, Besler C, Knau A, Fichtlscherer S, Röxe T, Zeiher A M, Landmesser U, Dimmeler S. Characterization of levels and cellular transfer of circulating lipoprotein-bound microRNAs. Arterioscler Thromb Vasc Biol. 2013 June; 33(6):1392-400. doi: 10.1161/ATVBAHA.112.300741.

26. Deregibus M C, Figliolini F, D'Antico S, Manzini P M, Pasquino C, De Lena M, Tetta C, Brizzi M F, Camussi G. Charge-based precipitation of extracellular vesicles. Int J Mol Med. 2016 November; 38(5):1359-1366. doi: 10.3892/ijmm.2016.2759.

27. Sui D P, Fan H T, Li J, Li Y, Li Q, Sun T. Application of poly (ethyleneimine) solution as a binding agent in DGT technique for measurement of heavy metals in water. Talanta. 2013 Sep. 30; 114:276-82. doi: 10.1016/j.talanta.2013.05.027.

28. Simpson R J. Precipitation of Proteins by Polyethylenimine. Cold Spring Harb Protoc; 2006(1); doi:10.1101/pdb.prot4312

29. Ma J, Hoang H, Myint T, Peram T, Fahrner R, Chou J H. Using precipitation by polyamines as an alternative to chromatographic separation in antibody purification processes. J Chromatogr B Analyt Technol Biomed Life Sci. 2010 Mar. 15; 878(9-10):798-806. doi: 10.1016/j.jchromb.2010.01.044

30. Marenchino M, Armbruster D W, Hennig M. Rapid and efficient purification of RNA-binding proteins: application to HIV-1 Rev. Protein Expr Purif. 2009 February; 63(2):112-9. doi: 10.1016/j.pep.2008.09.010.

31. Burgess R R. Protein precipitation techniques. Methods Enzymol. 2009; 463:331-42. doi: 10.1016/S0076-6879(09)63020-2. Review.

32. Boussif O, Lezoualc'h F, Zanta M A, Mergny M D, Scherman D, Demeneix B, Behr J P. A versatile vector for gene and oligonucleotide transfer into cells in culture and in vivo: polyethylenimine. Proc Natl Acad Sci USA. 1995 Aug. 1; 92(16):7297-301.

33. Hall A, Lächelt U, Bartek J, Wagner E, Moghimi S M. Polyplex Evolution: Understanding Biology, Optimizing Performance. Mol Ther. 2017 Jul. 5; 25(7):1476-1490. doi: 10.1016/j.ymthe.2017.01.024. Epub 2017 March 6. Review.

34. Wang X, Niu D, Hu C, Li P. Polyethyleneimine-Based Nanocarriers for Gene Delivery. Curr Pharm Des. 2015; 21(42):6140-56. Review.

35. Hobel S, Aigner A. Polyethylenimines for siRNA and miRNA delivery in vivo. Wiley Interdiscip Rev Nanomed Nanobiotechnol. 2013 September-October; 5(5):484-501. doi: 10.1002/wnan.1228. Epub 2013 May 29. Review.

36. Buscail L, Bournet B, Vernejoul F, Cambois G, Lulka H, Hanoun N, Dufresne M, Meulle A, Vignolle-Vidoni A, Ligat L, Saint-Laurent N, Pont F, Dejean S, Gayral S, Martins F, Torrisani J, Barbey O, Gross F, Guimbaud R, Otal P, Lopez F, Tiraby G, Cordelier P. First-in-man Phase 1 Clinical Trial of Gene Therapy for Advanced Pancreatic Cancer: Safety, Biodistribution, and Preliminary Clinical Findings. Mol Ther. 2015 April; 23(4): 779-789. Prepublished online 2015 January 14. Published online 2015 February 10. doi: 10.1038/mt.2015.1.

37. Amit D, Hochberg A. Development of targeted therapy for bladder cancer mediated by a double promoter plasmid expressing diphtheria toxin under the control of H19 and IGF2-P4 regulatory sequences. J Transl Med. 2010; 8: 134. Published online 2010 December 16. doi: 10.1186/1479-5876-8-134

38. Amit D, Hochberg A. Development of targeted therapy for a broad spectrum of cancers (pancreatic cancer, ovarian cancer, glioblastoma and HCC) mediated by a double promoter plasmid expressing diphtheria toxin under the control of H19 and IGF2-P4 regulatory sequences. Int J Clin Exp Med. 2012; 5(4): 296-305.

39. Shen C, Li J, Zhang Y, Li Y, Shen G, Zhu J, Tao J. Polyethylenimine-based micro/nanoparticles as vaccine adjuvants. Int J Nanomedicine. 2017 Jul. 31; 12:5443-5460. doi: 10.2147/IJN.S137980.

40. Kwolek U, Jamróz D, Janiczek M, Nowakowska M, Wydro P, Kepczynski M. Interactions of Polyethylenimines with Zwitterionic and Anionic Lipid Membranes. Langmuir. 2016 May 17; 32(19):5004-18. doi: 10.1021/acs.langmuir.6b00490.

41. Paris S, Burlacu A, Durocher Y. Opposing roles of syndecan-1 and syndecan-2 in polyethyleneimine-mediated gene delivery. J Biol Chem. 2008 Mar. 21; 283(12): 7697-704. doi: 10.1074/jbc.M705424200

42. Hanzlikova M[1], Ruponen M, Galli E, Raasmaja A, Aseyev V, Tenhu H, Urtti A, Yliperttula M. Mechanisms of polyethylenimine-mediated DNA delivery: free carrier helps to overcome the barrier of cell-surface glycosaminoglycans. J Gene Med. 2011 July; 13(7-8):402-9. doi: 10.1002/jgm.1587.

43. Ferrati S, McConnell K I, Mack A C, Sirisaengtaksin N, Diaz R, Bean A J, Ferrari M, Serda R E. Cellular communication via nanoparticle-transporting biovesicles. Nanomedicine (Lond). 2014 April; 9(5):581-592. doi: 10.2217/nnm.13.57. Epub 2013 June 3.

44. Uchida E, Kogi M, Oshizawa T, Furuta B, Satoh K, Iwata A, Murata M, Hikata M, Yamaguchi T. Optimization of the virus concentration method using polyethyleneimine-conjugated magnetic beads and its application to the detection of human hepatitis A, B and C viruses. J Virol Methods. 2007 July; 143(1):95-103.

45. Shchukina O, Zatirakha A V, Uzhel A S, Smolenkov A D, Shpigun O A. Novel polymer-based anion-exchangers with covalently-bonded functional layers of quaternized polyethyleneimine for ion chromatography. Anal Chim Acta. 2017 Apr. 29; 964:187-194. doi: 10.1016/j.aca.2017.01.062.

46. Jiang L, Jin Y, Marcus R K. Polyethylenimine modified poly(ethylene terephthalate) capillary channeled-polymer fibers for anion exchange chromatography of proteins. J Chromatogr A. 2015 Sep. 4; 1410:200-9. doi: 10.1016/j.chroma.2015.07.102. Epub 2015 July 29.

47. Liang J, Niu Q, Xu X, Luo Y, Zhou X, Deng Z, Wang Z. Effective elimination of nucleic acids from bacterial protein samples for optimized blue native polyacrylamide gel electrophoresis. Electrophoresis. 2009 July; 30(14): 2454-9. doi: 10.1002/elps.200900026.

48. Povey A C, Bartsch H, O'Neill I K. Magnetic polyethyleneimine (PEI) microcapsules as retrievable traps for carcinogen electrophiles formed in the gastrointestinal tract. Cancer Lett. 1987 July; 36(1):45-53.

49. Bonnet M E, Erbacher P, Bolcato-Bellemin A L. Systemic delivery of DNA or siRNA mediated by linear polyethylenimine (L-PEI) does not induce an inflammatory response. Pharm Res. 2008 December; 25(12):2972-82. doi: 10.1007/s11095-008-9693-1.

50. Wen Y, Pan S, Luo X, Zhang X, Zhang W and Feng M. A biodegradable low molecular weight polyethylenimine derivative as low toxicity and efficient gene vector. Bioconjug Chem. 2009; 20(2): 322-332.

51. Forrest M L, Koerber J T and Pack D W. A degradable polyethylenimine derivative with low toxicity for highly efficient gene delivery. Bioconjug Chem. 2003; 14(5): 934-940.
52. Leclercq F, Dubertret C, Pitard B, Scherman D and Herscovici J. Synthesis of glycosylated polyethylenimine with reduced toxicity and high transfecting efficiency. Bioorg Med Chem Lett. 2000; 10(11):1233-1235.
53. Aravindan L, Bicknell K A, Brooks G, Khutoryanskiy V V, Williams A C. Effect of acyl chain length on transfection efficiency and toxicity of polyethylenimine. Int J Pharm. 2009 Aug. 13; 378(1-2):201-10. doi: 10.1016/j.ijpharm.2009.05.052.
54. Hamdous Y, Chebbi I, Mandawala C, Le Fèvre R, Guyot F, Seksek O, Alphandéry E. Biocompatible coated magnetosome minerals with various organization and cellular interaction properties induce cytotoxicity towards RG-2 and GL-261 glioma cells in the presence of an alternating magnetic field. J Nanobiotechnology. 2017 Oct. 17; 15(1): 74. doi: 10.1186/s12951-017-0293-2.
55. Curtis K A, Miller D, Millard P, Basu S, Horkay F, Chandran P L. Unusual Salt and pH Induced Changes in Polyethylenimine Solutions. PLoS One. 2016 Sep. 29; 11(9):e0158147. doi: 10.1371/journal.pone.0158147.
56. Fujita Y, Yoshioka Y, Ito S, Araya J, Kuwano K, Ochiya T. Intercellular communication by extracellular vesicles and their microRNAs in asthma. Clin Ther. 2014 Jun. 1; 36(6):873-81. doi: 10.1016/j.clinthera.2014.05.006.
57. Chen J, Hu C, Pan P. Extracellular Vesicle MicroRNA Transfer in Lung Diseases. Front Physiol. 2017 Dec. 12; 8:1028. doi: 10.3389/fphys.2017.01028.
58. Samuel P, Fabbri M, Carter D R F. Mechanisms of Drug Resistance in Cancer: The Role of Extracellular Vesicles. Proteomics. 2017 December; 17(23-24). doi: 10.1002/pmic.201600375.
59. Bach D H, Hong J Y, Park H J, Lee S K. The role of exosomes and miRNAs in drug-resistance of cancer cells. Int J Cancer. 2017 Jul. 15; 141(2):220-230. doi: 10.1002/ijc.30669. Epub 2017 March 11. Review.
60. Kim K M, Abdelmohsen K, Mustapic M, Kapogiannis D, Gorospe M. RNA in extracellular vesicles. Wiley Interdiscip Rev RNA. 2017 July; 8(4). doi: 10.1002/wrna.1413.
61. Kinoshita T, Yip K W, Spence T, Liu F F. MicroRNAs in extracellular vesicles: potential cancer biomarkers. J Hum Genet. 2017 January; 62(1):67-74. doi: 10.1038/jhg.2016.87.
62. Fujita Y, Kuwano K, Ochiya T, Takeshita F. The impact of extracellular vesicle-encapsulated circulating microRNAs in lung cancer research. Biomed Res Int. 2014; 2014:486413. doi: 10.1155/2014/486413.
63. Julich H, Willms A, Lukacs-Kornek V, Kornek M. Extracellular vesicle profiling and their use as potential disease specific biomarker. Front Immunol. 2014 Sep. 1; 5:413. doi: 10.3389/fimmu.2014.00413.
64. Matsumoto Y, Kano M, Akutsu Y, Hanari N, Hoshino I, Murakami K, Usui A, Suito H, Takahashi M, Otsuka R, Xin H, Komatsu A, Iida K, Matsubara H. Quantification of plasma exosome is a potential prognostic marker for esophageal squamous cell carcinoma. Oncol Rep. 2016 November; 36(5):2535-2543. doi: 10.3892/or.2016.5066.
65. Allenson K, Castillo J, San Lucas F A, Scelo G, Kim D U, Bernard V, Davis G, Kumar T, Katz M, Overman M J, Foretova L, Fabianova E, Holcatova I, Janout V, Meric-Bernstam F, Gascoyne P, Wistuba I, Varadhachary G, Brennan P, Hanash S, Li D, Maitra A, Alvarez H. High prevalence of mutant KRAS in circulating exosome-derived DNA from early-stage pancreatic cancer patients. Ann Oncol. 2017 Apr. 1; 28(4):741-747. doi: 10.1093/annonc/mdx004.
66. Dragovic R A, Gardiner C, Brooks A S, Tannetta D S, Ferguson D J, Hole P, Carr B, Redman C W, Harris A L, Dobson P J, Harrison P, Sargent I L. Sizing and phenotyping of cellular vesicles using Nanoparticle Tracking Analysis. Nanomedicine. 2011 December; 7(6):780-8. doi: 10.1016/j.nano.2011.04.003.
67. Maas S L, de Vrij J, van der Vlist E J, Geragousian B, van Bloois L, Mastrobattista E, Schiffelers R M, Wauben M H, Broekman M L, Nolte-'t Hoen E N. Possibilities and limitations of current technologies for quantification of biological extracellular vesicles and synthetic mimics. J Control Release. 2015 Feb. 28; 200:87-96. doi: 10.1016/j.jconrel.2014.12.041.
68. Kotmakçi M, Bozok ÇetintaşV. Extracellular Vesicles as Natural Nanosized Delivery Systems for Small-Molecule Drugs and Genetic Material: Steps towards the Future Nanomedicines. J Pharm Pharm Sci. 2015; 18(3):396-413.
69. Sutaria D S, Badawi M, Phelps M A, Schmittgen T D. Achieving the Promise of Therapeutic Extracellular Vesicles: The Devil is in Details of Therapeutic Loading. Pharm Res. 2017 May; 34(5):1053-1066. doi: 10.1007/s11095-017-2123-5.
70. Dickman C T, Lawson J, Jabalee J, MacLellan S A, LePard N E, Bennewith K L, Garnis C. Selective extracellular vesicle exclusion of miR-142-3p by oral cancer cells promotes both internal and extracellular malignant phenotypes. Oncotarget. 2017 Feb. 28; 8(9):15252-15266. doi: 10.18632/oncotarget.14862.

The invention claimed is:

1. A method for the removal of extracellular vesicle(s) (EV)s from a sample containing EVs, comprising:
   (i) contacting the sample with a solution of polyethylenimines to form EV-polyethylenimine complexes; and
   (ii) precipitating out the EV-polyethylenimine complexes to remove the EVs from the sample,
   wherein the polyethylenimines are present in the solution at a concentration of from about 1 µg/mL to about 5 mg/mL, the solution of polyethylenamines is the only precipitating agent used in the method and the EVs are from a biological sample.

2. The method of claim 1, wherein the sample is pre-cleared to remove debris or interfering substances before contacting with the solution of polyethylenimines.

3. The method of claim 1, wherein the polyethylenimines are selected from the group consisting of linear forms with a molecular weight (MW) ranging from about 2500 to about 250,000 Da, branched forms with a MW ranging from about 600 Da to about 750,000 Da, and dendrimer forms comprising generations 1 to 6, whether intact or fractured.

4. The method of claim 1, wherein the polyethylenimines are branched polyethylenimines having a MW of 10,000 Da or 25,000 Da.

5. The method of claim 1, wherein the polyethylenimines are linear 22,000 Da polyethylenimines, linear 25,000 Da polyethylenimines, or linear 160,000 Da polyethylenimines.

6. The method of claim 1, wherein the polyethylenimines are subjected to one or more processing steps prior to use in the method.

7. The method of claim 6, wherein the one or more processing steps are selected from the group consisting of purification, chemical-functionalization and attachment to solid supports.

8. The method of claim 1, wherein the polyethylenimines are bonded to a solid support which aids in the separation of the EVs from the sample and in the removal of EVs.

9. The method of claim 1, wherein the polyethylenimines are conjugated to a ligand which aids in the separation of the EVs from the sample.

10. The method of claim 1, wherein the polyethylenimines are fixed to a solid support comprising silicones or other surfaces of a microfluidic apparatus, to aid in the removal of EVs from the sample.

11. The method of claim 10, wherein the solid support is magnetic beads coated with the polyethylenimines.

12. The method of claim 1, wherein the microfluidics apparatus further comprises downstream molecular analysis components.

13. The method of claim 1, wherein the biological sample is selected from the group consisting of human, animal or human cell line.

14. The method of claim 10, wherein the polyethyleneimines are fixed to a surface plasma resonance sensor.

* * * * *